United States Patent

Rabourn et al.

[11] Patent Number: 5,092,012
[45] Date of Patent: Mar. 3, 1992

[54] APPARATUS FOR BUFFING AND OTHERWISE TREATING AIRCRAFT BODIES

[76] Inventors: William B. Rabourn, Rte. 1, Box 126; Daniel R. Heckart, 106 S. Prospect, both of Sedalia, Mo. 65301

[21] Appl. No.: 465,932

[22] Filed: Jan. 16, 1990

[51] Int. Cl.⁵ .............................. B64F 5/00; D60S 3/06
[52] U.S. Cl. ...................................... 15/97.3; 15/53.1; 15/53.2; 15/DIG. 2
[58] Field of Search ................... 15/53.1, 53.2, 53.3, 15/DIG. 2, 97.3; 134/6; 51/99

[56] References Cited

U.S. PATENT DOCUMENTS

| | | | |
|---|---|---|---|
| 3,104,406 | 9/1963 | Rhodes | 15/53.1 |
| 3,196,472 | 7/1965 | Ventrella | 15/53.1 |
| 3,439,372 | 4/1969 | Collier | 15/53.1 |
| 3,460,177 | 8/1969 | Rhinehart et al. | 15/53.1 |
| 3,775,798 | 12/1973 | Thornton-Trump | 15/53.2 |
| 4,668,301 | 5/1987 | Takigawa et al. | 15/53.2 |

Primary Examiner—Edward L. Roberts
Attorney, Agent, or Firm—Kokjer, Kircher, Bowman & Johnson

[57] ABSTRACT

An aircraft buffing machine includes a main telescopic boom mounted for up and down movement on a mobile unit. A rotary boom is carried on the end of the main boom and mounts on its outer end a pivot boom having a telescopic floating boom carrying a buffing head. Controls for the machine automatically move the main boom up and down if the floating boom is fully retracted or fully extended so that the buffing head is able to follow the contour of a work surface. If the buffing head pivots excessively on the floating boom, corrective action is automatically taken. A safety bar system extending around the buffing head shuts the machine down is an obstacle is encountered.

20 Claims, 12 Drawing Sheets

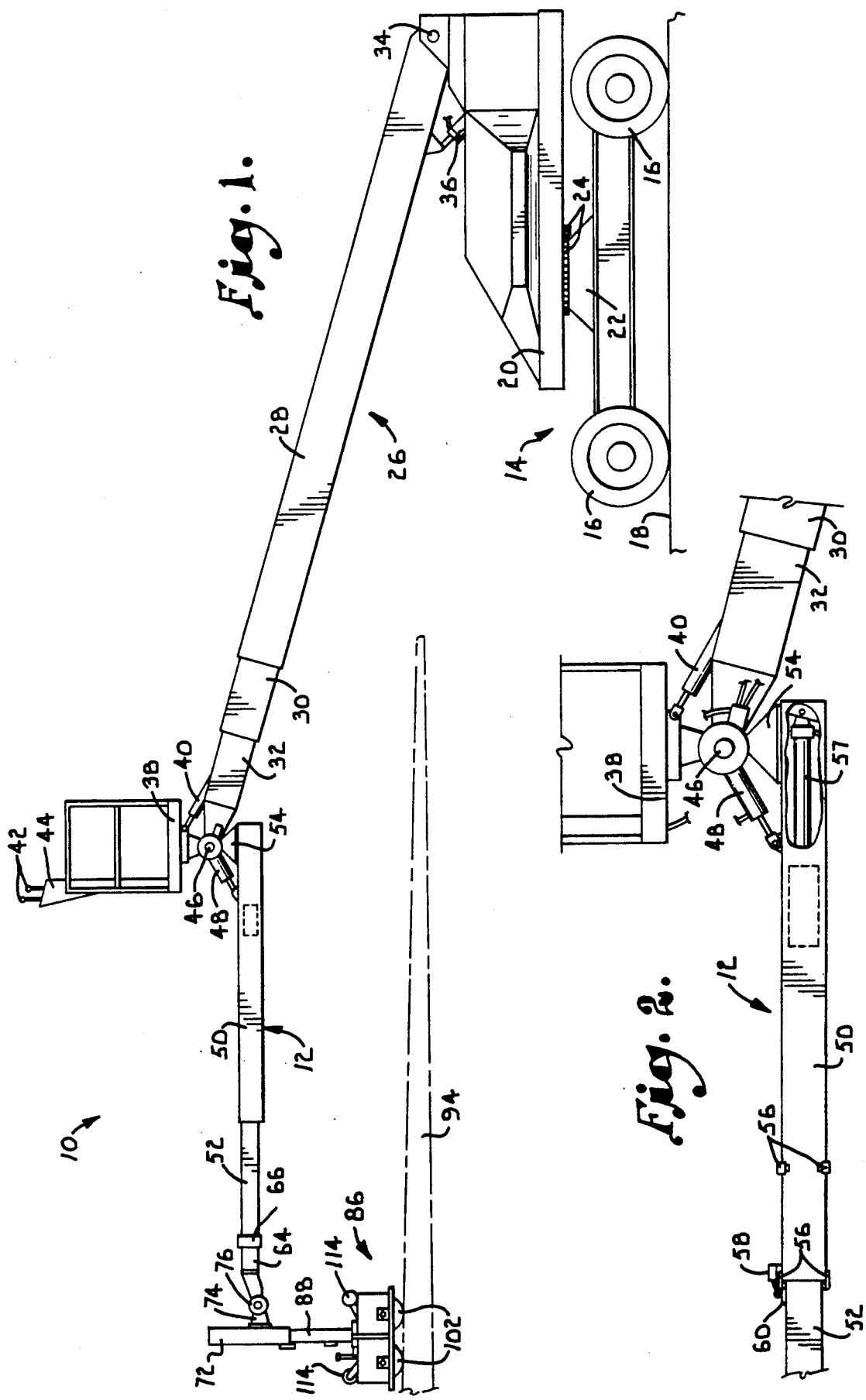

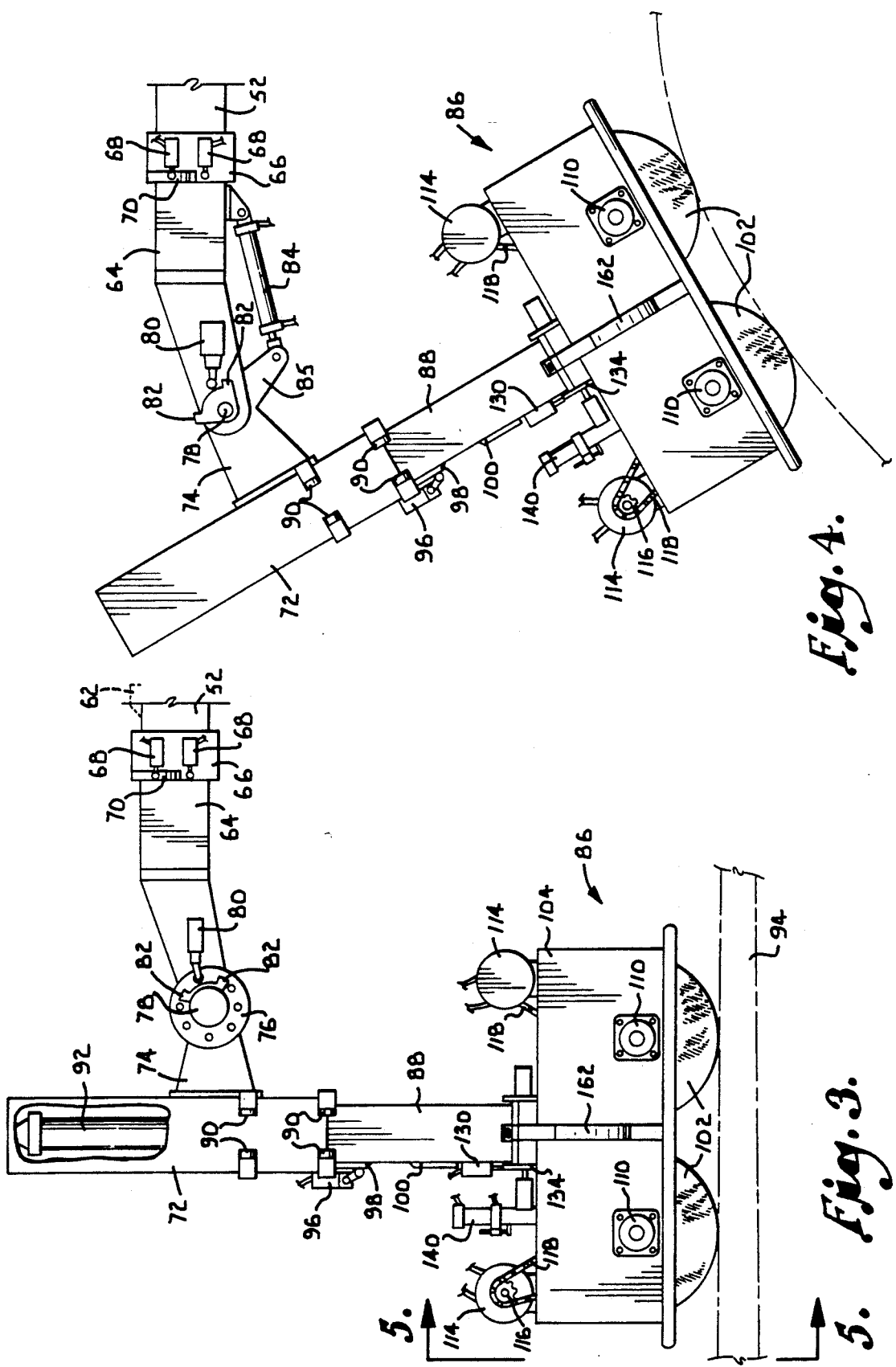

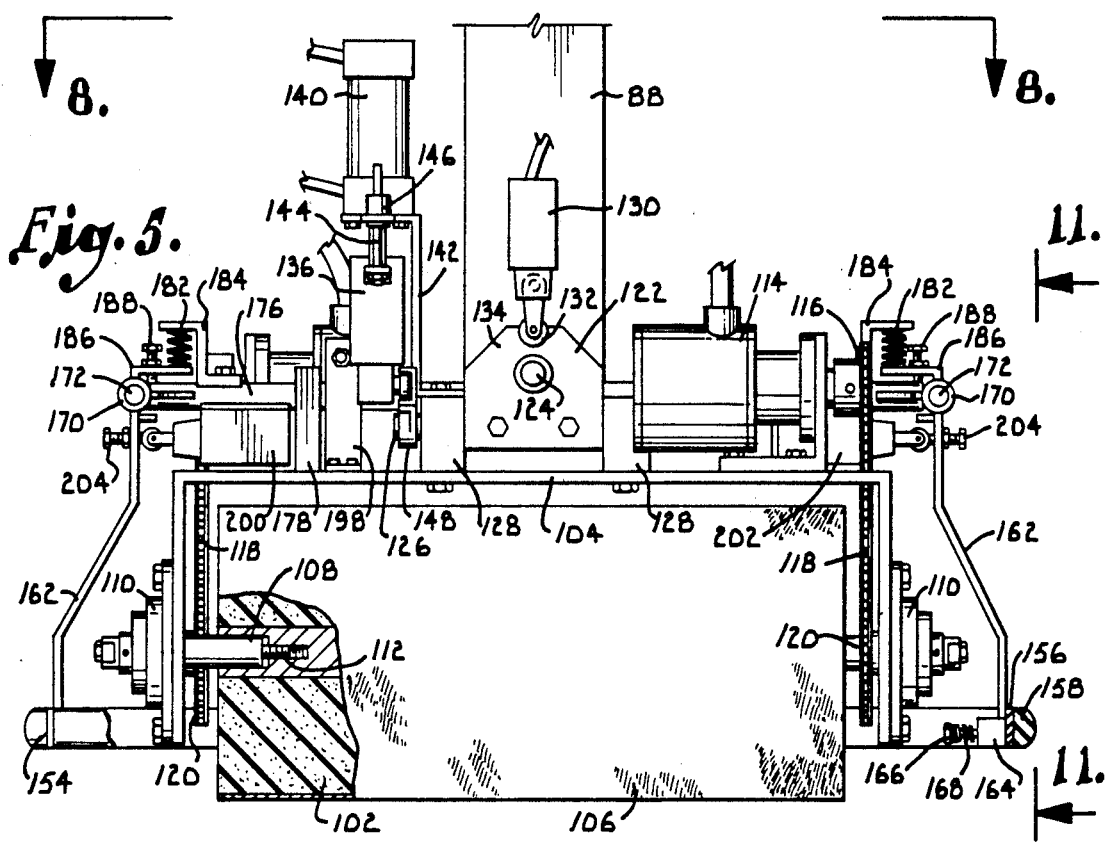

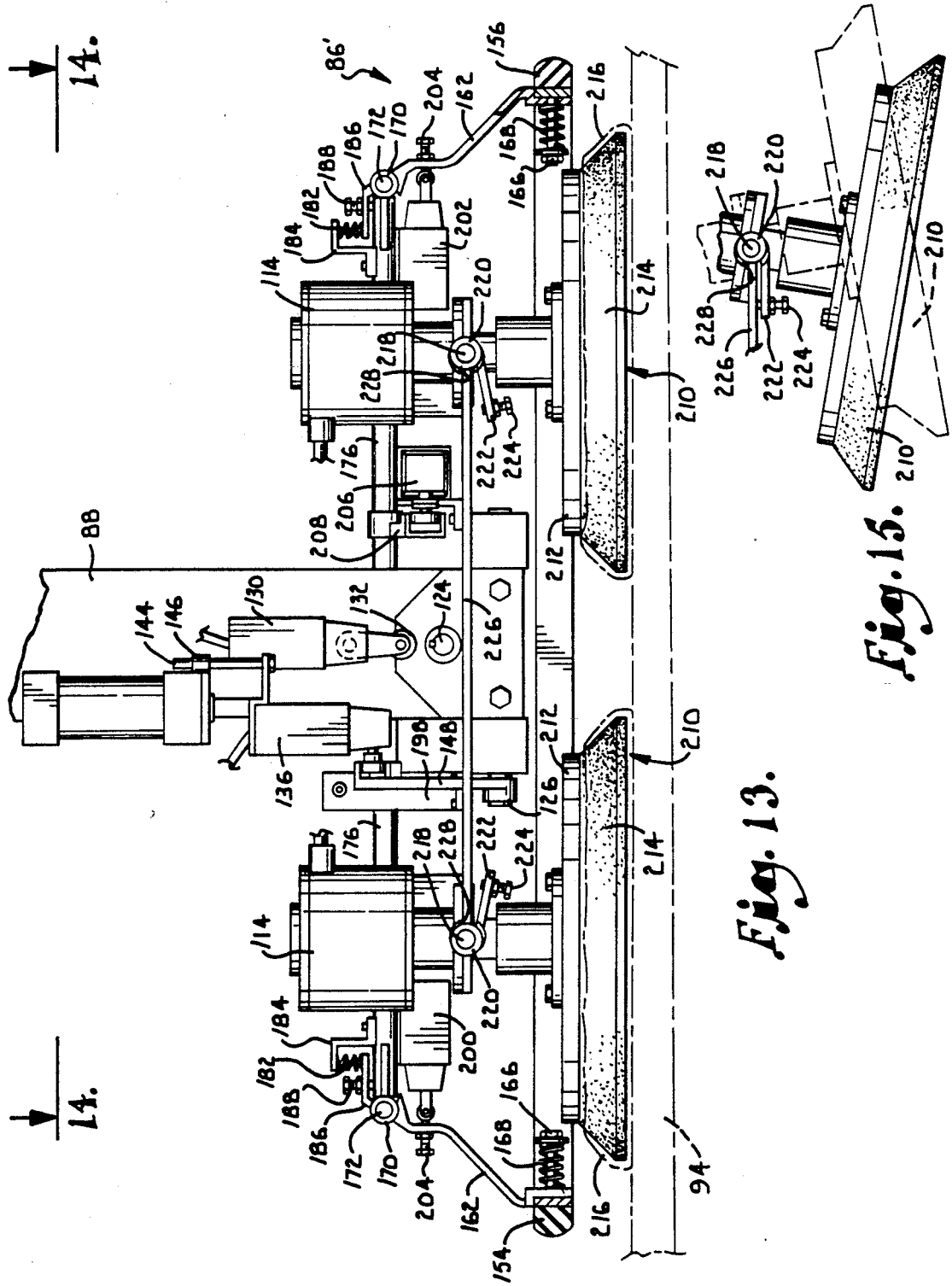

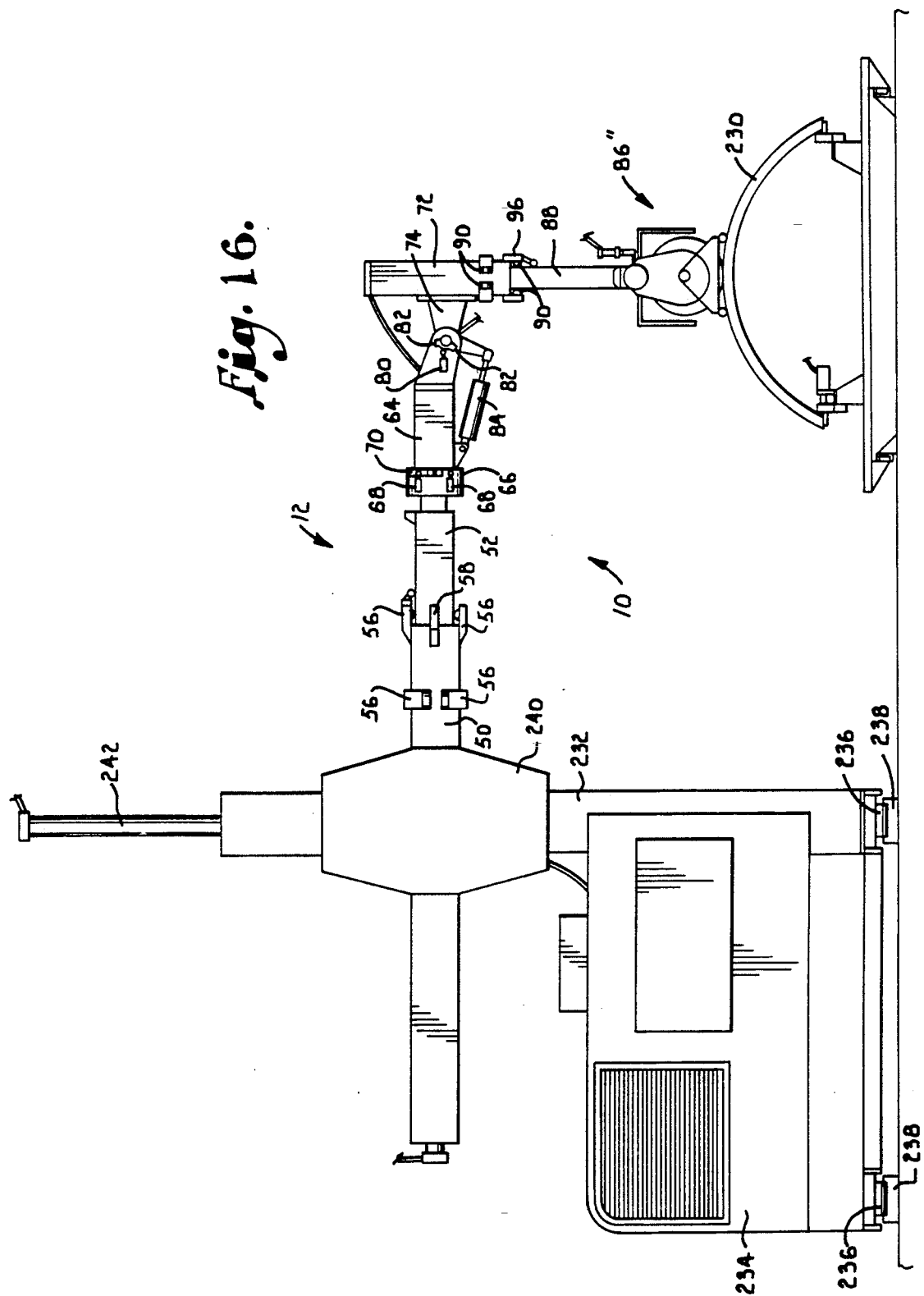

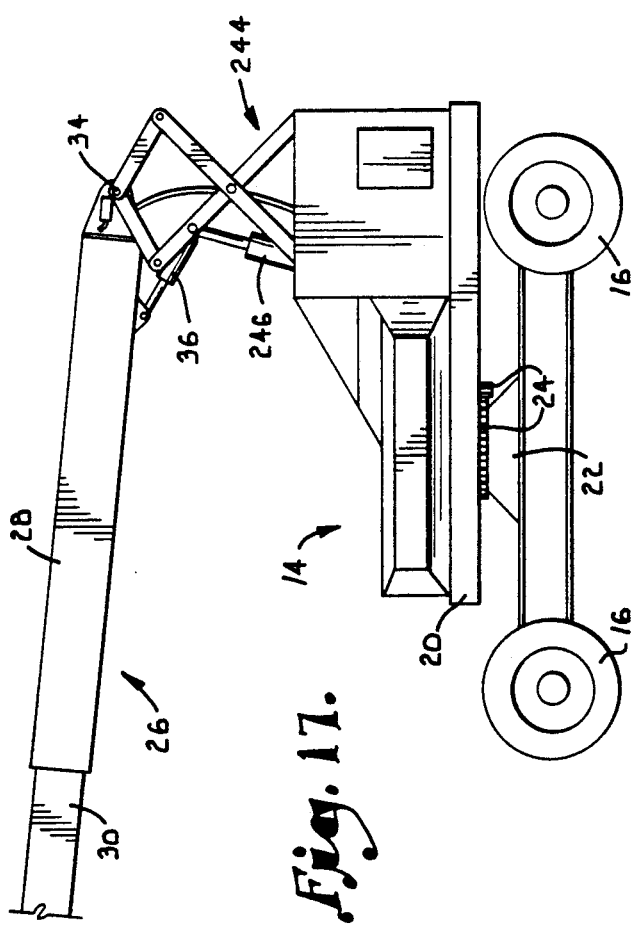
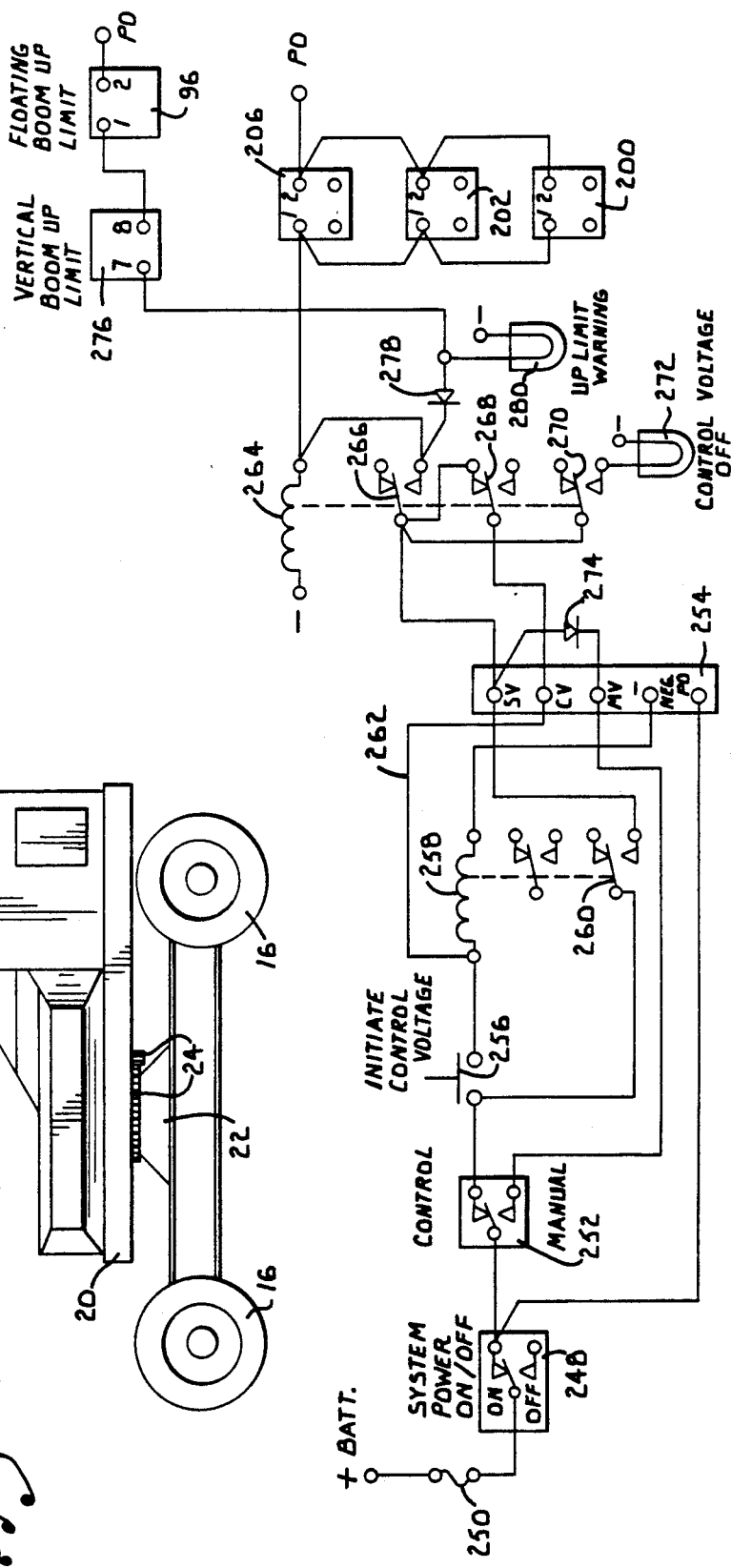

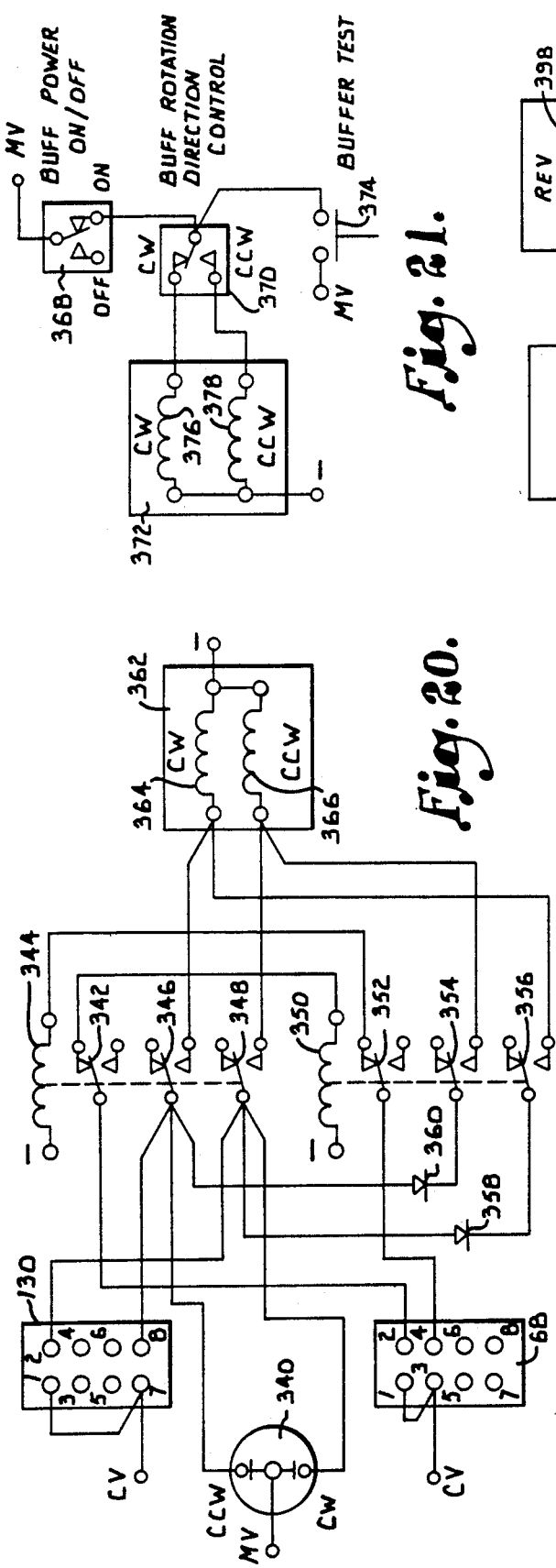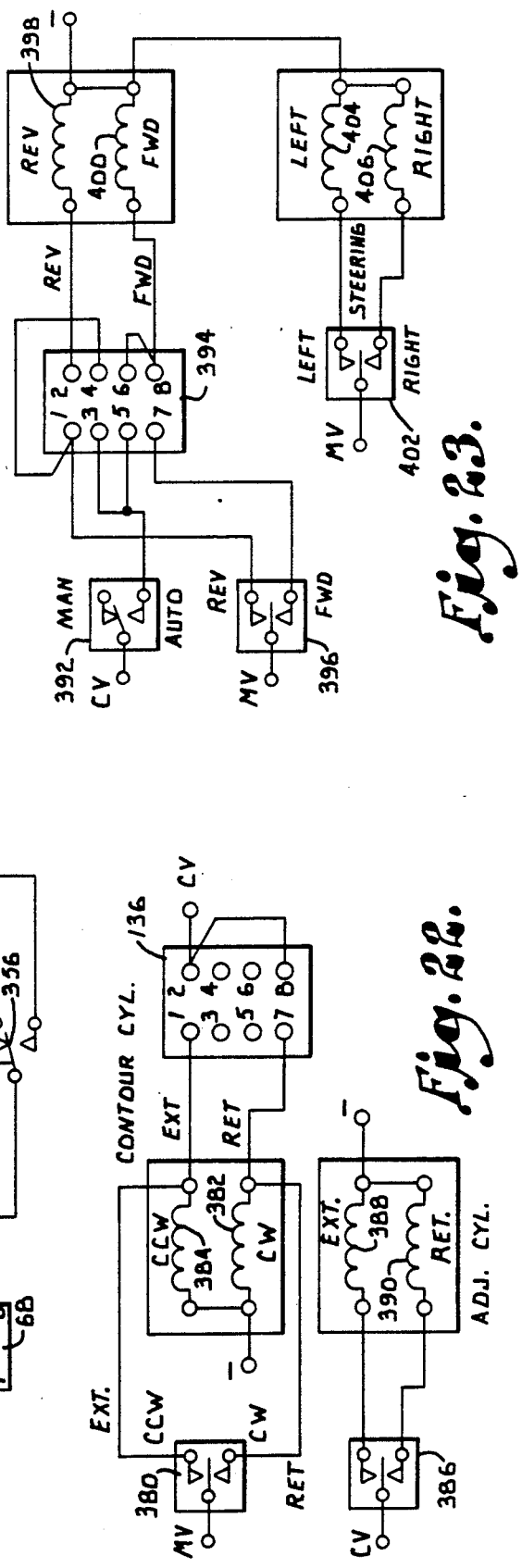

APPARATUS FOR BUFFING AND OTHERWISE TREATING AIRCRAFT BODIES

BACKGROUND OF THE INVENTION

This invention relates generally to the treatment of aircraft bodies and deals more particularly with a machine which buffs or otherwise treats aircraft bodies having a wide variety of sizes and shapes.

The routine maintenance of both large and small aircraft involves cleaning and otherwise treating the aircraft body from time to time. In addition to general cleaning activity, the aircraft body must sometimes be buffed, waxed, sanded, sandblasted, painted or otherwise treated with finishing materials. Commercial aircraft can be made more appealing by keeping the body clean and otherwise attractive in appearance. The need to treat aircraft bodies in this fashion adds significantly to the maintenance costs and is highly labor intensive because the treatment is normally carried out by relatively highly skilled maintenance workers.

The present invention is directed to an automated aircraft body treatment machine that may be used to buff, sand, apply finishing materials or otherwise treat an aircraft body, regardless of its size. It is a particular feature of the invention that a single worker can operate the machine to treat an entire aircraft body more quickly and in a much more efficient manner than has heretofore been possible. Another important feature of the invention is the ability of the machine to treat surfaces of virtually any size and contour. The machine is further characterized by its ability to reach all parts of the bodies of even the largest commercial and military aircraft.

In accordance with the invention, a main telescopic boom is mounted on a mobile machine which can be positioned as desired relative to the aircraft. The mobile machine can raise and lower the main boom either by extending and retracting a boom assembly on the mobile unit or by moving the main boom up and down on a vertical column carried on the mobile unit. In either event, the main boom can be moved up and down and can be extended and retracted under the control of the operator of the machine.

A rotary boom is mounted on the end of the main boom by a rotary actuator. Carried on the end of the rotary boom is a pivot boom that can be pivoted in opposite directions by either a rotary actuator or a hydraulic cylinder. The pivot boom has a telescopic floating boom extending from it, and the floating boom in turn carries a buffing head on its outer end. The buffing head is provided with one or more power driven buffing devices. The connection between the buffing head and the floating boom provides the buffing head with the ability to pivot about two mutually perpendicular pivot axes. By providing the main boom with the capability of up and down movement as well as extension and retraction, and by providing the rotary and pivot booms, the buffing head can be positioned as desired to buff whatever surface of the airplane is to be treated, and the buffing head can be oriented properly to provide effective buffing action against the surface.

In addition, the control system for the machine is specially arranged to allow the buffing head to automatically follow contoured surfaces, to automatically take corrective action if the buffing head is unduly tilted about either of its pivot axes, and to automatically shut down the machine if an obstacle is encountered by the buffing head. The control system includes limit switches which sense limiting positions of the various booms and other machine components and which provide control signals when limiting positions are reached.

DESCRIPTION OF THE DRAWINGS

In the accompanying drawings which form a part of the specification and are to be read in conjunction therewith and in which life reference numerals are used to indicate like parts in the various views:

FIG. 1 is a side elevational view of an aircraft buffing machine constructed according to a preferred embodiment of the present invention, with a portion of an airplane wing that is being buffed shown in broken lines;

FIG. 2 is a fragmentary side elevational view on an enlarged scale of the portion of the buffing machine adjacent to the connection between the telescoping boom assembly of the mobile truck and the main boom of the buffing machine, with a portion broken away for purposes of illustration;

FIG. 3 is a fragmentary side elevational view on an enlarged scale of the buffing head and adjacent portions of the aircraft buffing machine shown in FIG. 1, with a portion of the airplane wing shown in broken lines and a portion of the pivot boom of the buffing machine broken away for purposes of illustration;

FIG. 4 is a fragmentary side elevational view similar to FIG. 3, but showing an alternative actuator for the pivot boom and showing the pivot boom in an inclined orientation;

FIG. 5 is a fragmentary front elevational view of the buffing head taken generally along lines 5—5 of FIG. 3 in the direction of the arrows, with portions broken away for purposes of illustration;

FIG. 6 is a fragmentary front elevational view of the buffing head similar to FIG. 5, but showing the left side safety bar deflected by an obstacle, with the break lines indicating continuous length;

FIG. 7 is a fragmentary sectional view on an enlarged scale taken generally along line 7—7 of FIG. 6 in the direction of the arrows;

FIG. 13 is a front elevational view depicting a modified buffing head that may be incorporated in the buffing machine of the present invention, with a portion of an aircraft wing that is being buffed shown in broken lines;

FIG. 15 is a front elevational view of one of the buffers on the buffing head shown in FIG. 13, with the solid and broken lines depicting the extreme pivotal positions of the buffer;

FIG. 16 is a side elevational view of an aircraft buffing machine constructed according to a modified embodiment of the present invention and showing an aircraft cowling being buffed by the buffer head;

FIG. 17 is a fragmentary side elevational view similar to FIG. 1 but depicting a truck that is equipped with a scissor type lift device on which the buffing machine of the present invention may be mounted;

FIG. 18 is an electrical schematic of the power distribution system and safety shut down system of the buffing machine;

FIG. 20 is an electrical schematic of the control system for the rotary boom of the buffing machine;

FIG. 21 is an electrical schematic of the control circuitry for the buffers of the buffing machine;

FIG. 22 is an electrical schematic of the control circuitry for the pivot boom of the buffing machine and the adjustment system for one of the limit switches which is included in the machine;

FIG. 23 is an electrical schematic of the control circuitry for the travel and steering of the mobile truck unit of the buffing machine;

DETAILED DESCRIPTION OF THE INVENTION

Figure 8:
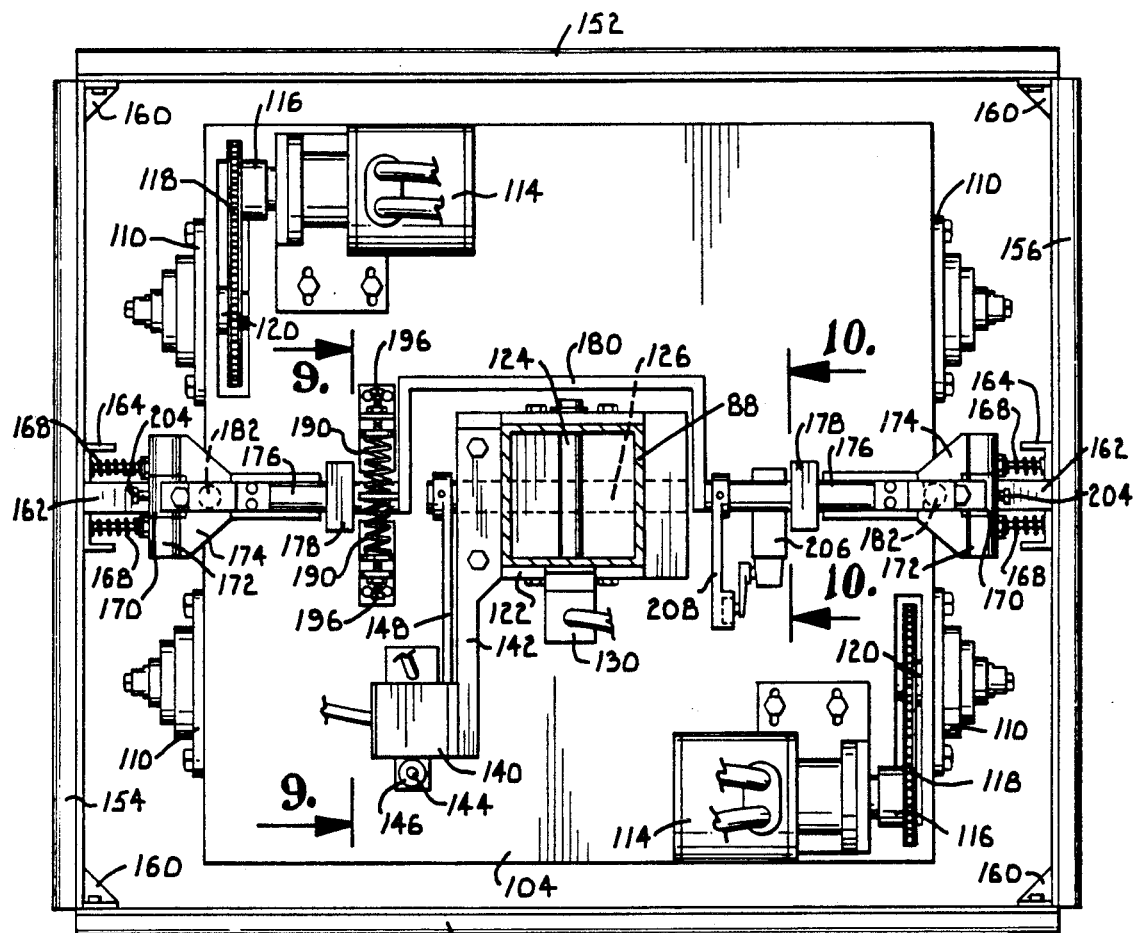
FIG. 8 is a fragmentary top plan view of the buffing head taken generally along line 8—8 of FIG. 5 in the direction of the arrows.

Referring now to the drawings in more detail and initially to FIG. 1, numeral 10 generally designates a machine which functions to buff aircraft bodies such as the bodies of "jumbo" jets and other large commercial and military airplanes, as well as smaller airplanes and other types of aircraft and aircraft parts. The aircraft buffing machine 10 includes a main boom which is generally identified by numeral 12 and which may be mounted on various types of equipment, depending upon the particular application in which it is to be used. As shown in FIG. 1, the main boom 12 of the buffing machine is mounted on a mobile unit which takes the form of a conventional wheeled truck 14 having wheels 16 that travel along a floor 18 or other surface. The truck 14 is equipped with a suitable engine or other prime mover (not shown) which propels it along the floor 18, and some or all of the wheels 16 may be steerable wheels. A platform 20 which is mounted for rotation on a turret 22 is driven rotatively on the turret by a drive system which includes mating gears 24. Mounted on the platform 20 is a large telescoping boom assembly 26 having a base section 28, an intermediate section 30 and an outer section 32. The base section 28 is mounted on the platform 20 for up and down pivotal movement about a horizontal pivot axis 34, and its up and down pivotal movement is carried out by extending and retracting a hydraulic cylinder 36. The intermediate section 30 may be extended out of and retracted into the base section 28 by a conventional hydraulic cylinder (not shown). Similarly, the outer boom section 32 may be telescopically extended out of and retracted into the intermediate section 30 by a hydraulic cylinder (not shown). When fully extended, the boom 26 may have a length of approximately 60 feet or more if necessary.

An operator's stand 38 is carried on the outboard end of the outer or upper boom section 32. A power cylinder 40 is suitably controlled to maintain the floor of the operator's stand 38 in a substantially horizontal orientation irrespective of the angular orientation or incline of the boom 26. Suitable controls 42 which control the various operations of the buffing machine are mounted on a control console 44 on the operator's stand 38. The controls 42 are located at a convenient height for access by a worker stationed on the operator's stand 38.

In accordance with the present invention, the main boom 12 of the buffing machine is mounted on the outboard end of the outer boom section 32 for pivotal movement relative thereto about a horizontal pivot axis 46. As boom 12 is raised and lowered by telescopic extension of the boom 26 or by raising and lowering the boom about axis 34, a hydraulic cylinder 48 is suitably controlled to maintain boom 12 in a substantially horizontal orientation at all times.

The main boom 12 includes a base boom section 50 at its inboard end and an extension boom section 52 at its outboard end. The base section 50 is pivotally connected with boom section 32 by a mounting bracket 54. The extension boom 52 is mounted to the base boom 50 for axial extension and retraction, with suitable bearings 56 (see FIG. 2) supporting the extension boom for in and out telescopic movement. A hydraulic cylinder 57 may be extended to extend boom section 52 and retracted to retract boom section 52. With continued reference to FIG. 2 in particular, a limit switch 58 is mounted on the outer end of the base boom section 50. When the extension boom 52 is fully extended, the switch arm of limit switch 58 is tripped by a raised surface 60 located on the inner part of boom section 52. A similar raised surface 62 (see FIG. 3) is provided on the outer end portion of boom 52, in order to trip the switch arm of limit switch 58 when boom section 52 is fully retracted.

As last shown in FIG. 3, a rotary boom 64 is mounted on the outboard end of the extension boom section 52. The rotary boom 64 essentially forms a continuation of boom section 52 and may be rotated by a conventional rotary actuator 66 which rotates the rotary boom 64 about an axis coinciding with the longitudinal axis of the main boom 12. The actuator 66 is a hydraulically powered actuator. A limit switch 68 is mounted on the rotary actuator 66 and has a switch arm that rides on a raised surface 70 which extends around the rotary boom 64 through an arc of approximately 180°. When the rotary boom 64 is rotated in either direction to a position where the switch arm of limit switch 68 drops off of the raised surface 70, the limit switch 68 is actuated in a manner to limit the rotation of boom 64 to an arc of approximately 180°, as will be explained more fully.

The outboard end of the rotary boom 64 is connected with a pivot boom 72 by means of a mounting bracket 74 secured to the pivot boom and a rotary actuator 76 connected with the bracket 74. The actuator 76 is a conventional hydraulically powered actuator which operates to pivot the pivot boom 72 about the central horizontal axis 78 of the actuator. The pivot axis 78 is perpendicular to the axis of the actuator 66 for the rotation boom. A limit switch 80 is mounted on the rotary boom 64 and has its switch arm extending between a pair of spaced apart trips 82 which project from the rotary actuator 76 and rotate when the pivot boom 72 is rotated about axis 78. The trips 82 engage the arm of the limit switch 80 to limit the arc of the pivotal movement of the pivot boom 72 about the actuator axis 78.

FIG. 4 depicts an alternative arrangement for effecting pivotal movement of the pivot boom 72. In this arrangement, the rotary actuator 76 is replaced by a hydraulic cylinder 84 which is connected to a projecting arm 85 on the mounting bracket 74. The cylinder 84 is arranged to pivot the pivot boom 72 outwardly about axis 78 when the cylinder is extended and to pull the pivot boom inwardly about axis 78 when the cylinder 84 is retracted. In other respects, the arrangement of FIG. 4 is identical to that depicted in FIG. 3.

Referring again to FIG. 3, a buffing head which is generally identified by numeral 86 is carried on the lower end of a floating boom 88 which extends telescopically from the lower end of the pivot boom 72, The floating boom 88 can extend out of and retract into the pivot boom 72 telescopically, and its inward and outward movement is supported by suitable bearings 90. A pneumatic cylinder 92 is mounted within the pivot boom 72 and has its rod end connected with the floating boom 88. As will be explained more fully, constant pneumatic pressure is applied to the floating boom 88 by the pneumatic cylinder 92 in order to continually urge the buffing head 86 outwardly with constant force to maintain the buffing head 86 in contact with an airplane wing 94 or some other work surface against which the buffing head is engaged.

A limit switch 96 is mounted on the lower end of the pivot boom 72. The floating boom 88 is provided with an upper raised surface 98 and a lower raised surface 100 which are preferably spaced apart from one another by a distance of approximately 12 inches. When the floating boom 88 is fully extended as shown in FIG. 3, the switch arm of limit switch 96 rides up on the upper surface 98 to provide an indicatation that the floating boom has reached its extension limit. Conversely, when the floating boom 88 is fully retracted, the switch arm of limit switch 96 rides up on the lower raised surface 100 provide an indication that the floating boom has reached its retraction limit. Normally, the arm of switch 98 operates in the space between the upper and lower trip surfaces 98 and 100, and this space is preferably about 12 inches long although it may have any desired length.

Referring now to FIGS. 5–8 in particular, the buffing head 86 includes a pair of parallel buffing rollers 102 which are mounted for rotation between the opposite side plates of a C shaped bracket plate 104 which is carried on the lower end of the float boom 88. Each of the rollers 102 is cylindrical and is covered with a soft cover 106 (see FIG. 5) which may be wool or some other soft material which provides an effective buffer. The main body portion of each roller 102 may be rubber or a similar material. As best shown in FIG. 5, each roller 102 has a pair of stub shafts 108 which are threaded into the roller so that the roller rotates with the shafts. The shafts 108 in each pair are axially aligned and are supported for rotation by bearings 110 mounted on the outsides of the side portions of the bracket plate 104. The threaded connection between each shaft 108 and the corresponding roller 102 is indicated at 112 in FIG. 5, and this manner of mounting the rollers allows them to be quickly and easily changed by threading the shafts 108 out of the rollers and substituting fresh rollers before again threading the shafts into the rollers.

A pair of conventional hydraulic motors 114 are provided for driving the respective rollers 102. The motors 114 are mounted on top of the bracket plate 104, and each motor drives a sprocket 116 which is carried on the output shaft of the motor. A drive chain 118 is drawn around each sprocket 116 and also around another sprocket 120 which is carried on one of the shafts 108 in each pair of shafts. As will be explained more fully, the control system applies hydraulic fluid to the two buffer motors 114 in a manner to cause both rollers 102 to rotate in the same direction.

The buffing head 86 is mounted on the floating boom 88 in a manner permitting it to pivot about two mutually perpendicular axes. A mounting block 122 is pinned to the lower end of boom 88 by a horizontal pin 124 which is oriented perpendicular to the shafts 108 and to the longitudinal axis of the floating boom 88. Another horizontal pin 126 which is oriented perpendicular to pin 124 or parallel with the axes of shafts 108 (and perpendicular to the axis of boom 88) connects the pivot block 122 with a pair of mounting blocks 128 secured on top of bracket plate 104 on opposite sides of the pivot block 122. The buffer head 86 can thus pivot both about the axis of pin 124 and the axis of pin 126 by virtue of this mounting arrangement.

Pivotal movement of the buffing head about pin 124 is monitored by a limit switch 130 which is mounted to the floating boom 88. The switch arm of the limit switch 130 is received in a notch 132 which is formed in the top edge of a plate 134 secured to the front of pivot block 122. Consequently, when block 122 pivots in opposite directions about pin 124, the arm of limit switch 130 is pivoted in opposite directions.

Pivotal movement of the buffer head 86 about pin 126 is monitored by another limit switch 136 which may be adjusted up or down. Limit switch 136 is mounted on a plate 138 which is carried on the bottom or rod end of a hydraulic adjustment cylinder 140. The cylinder 140 is in turn mounted on a bracket 142 which is secured on top of one of the bearing blocks 128. A guide rod 144 is secured to the mounting plate 138 through a bushing 146 mounting on the bracket 142. The guide rod 144 is parallel to the rod of cylinder 140 and assures that there will be no binding or other disorientation or improper movement of plate 138 as it is moved upwardly and downwardly when the cylinder 140 is retracted and extended.

Figure 9:
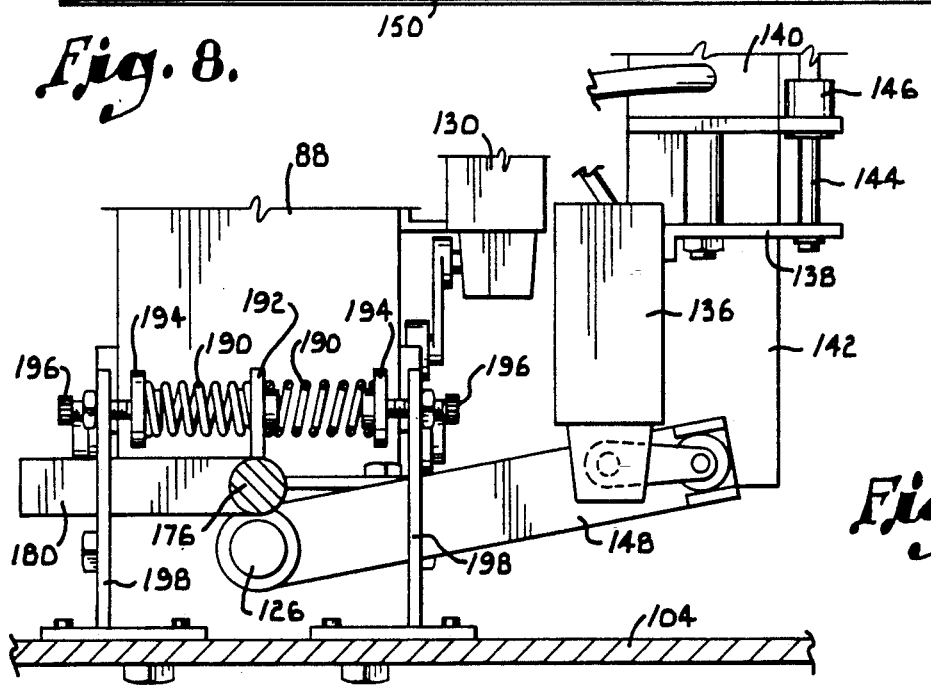
FIG. 9 is a fragmentary sectional view on an enlarged scale taken generally along line 9—9 of FIG. 8 in the direction of the arrows.

As best shown in FIG. 9, the switch arm of limit switch 136 is received in a channel formed in one end of an arm 148 which is pinned or otherwise secured at its opposite end to the pivot shaft 126. Thus, when the pivot shaft 126 is turned in opposite directions due to pivoting of the pivot block 122 in opposite directions, the arm 148 pivots the switch arm of limit switch 136 in opposite directions so that the pivotal movement of the buffer head about the axis of shaft 126 is thereby monitored. Preferably, suitable return springs (not shown) are provided to urge the buffer head 86 about the axes of pins 124 and 126 in a manner to bias the buffer head toward a neutral position wherein the plane of the top plate of bracket 104 is perpendicular to the longitudinal axis of the floating boom 88.

The buffer head 86 is surrounded by a plurality of interconnected safety bars, including front and rear safety bars 150 and 152 and left and right side safety bars 154 and 156. As best shown in FIG. 8, the safety bars are connected in a substantially square configuration and extend continuously around the rollers 102. Each safety bar is provided on its outside surface with a rubber bumper pad 158 (see FIGS. 5 and 6 in particular). The side safety bars are connected at their opposite ends with the opposite ends of the front and rear safety bars by means of flanged connections 160 which are best shown in FIG. 8.

The side bars 154 and 156 are each carried on a strap 162 which has a resilient connection with the safety bar. The type of connection that is employed is best shown in FIG. 7 for the right safety bar 156, and it is to be understood that the left safety bar 154 has a similar connection with its strap 162. The lower end of strap 162 connects with a bracket 164 through which a pair of bolts 166 loosely extend and are threaded to the safety bar 156. Compression springs 168 encircle the shanks of bolts 166 and act between the bolt heads and the bracket 164. The springs 168 thus pull the side safety bars 154 and 156 inwardly such that they are normally maintained against the respective brackets 164. However, each bar can move outwardly away from its bracket, as shown for the right bar 156 in FIG. 6.

The top end of each strap 162 carries a sleeve 170 which fits around a pin 172. Each sleeve 170 can turn about the axis of its pin 172 to permit the side safety bars to be deflected inwardly when they encounter an obstacle, as shown for the left safety bar 154 in FIG. 6. Extending inwardly from each of the pins 172 is a plate 174, and each plate 174 connects with a shaft 176 which is supported for rotation by suitable bearings such as the bearings 178 which are mounted on plate 104. The inside ends of the shafts 176 are connected by a C shaped bracket 180.

By virtue of this mounting arrangement for the safety bars, each of the side safety bars 154 and 156 can pivot inwardly about its pin 172 when deflected by an obstacle that is encountered. When the front safety bar 150 or the rear safety bar 152 encounters an obstacle, the entire safety bar assembly can pivot about the axis of the aligned shafts 176.

A return spring 182 is provided for each of the side safety bars 154 and 156. As best shown in FIGS. 5 and 6, the springs 182 act between brackets 184 and 186 at the top and bottom. Bracket 184 is mounted on the horizontal shaft 176, while the other bracket 186 is mounted on the sleeve 170. Consequently, when one of the side safety bars is deflected inwardly, as shown for the left safety bar 154 in FIG. 6, its spring 182 is compressed and thus urges the safety bar to return to its normal position. It is noted that when one of the side safety bars is deflected inwardly, the opposite bar moves outwardly, but the mounting strap 162 for the opposite safety bar is not deflected because of the resilient connections (provided by springs 168) between the side safety bars and the mounting straps.

An adjustment bolt 188 is threaded downwardly through each bracket 186, and the tip of each bolt 188 engages the top of the corresponding shaft 176 in order to prevent the springs 182 from pivoting the straps 162 outwardly beyond the position of the straps shown in FIG. 5. Either or both of the bolts 188 can be adjusted in order to vary the normal position of the side safety bars.

The front and rear safety bars 150 and 152 are similarly urged toward normal positions by a pair of return springs 190. With particular reference to FIG. 9, both springs 190 act at their inside ends against a lug 192 which projects upwardly from the inner end of one of the shafts 176. At their outer ends, the springs 190 act against small plates 194 which are carried on the ends of adjustment screws 196. The screws 196 are threaded through brackets 198 which are mounted on the bracket plate 104. When the shaft 176 is pivoted in one direction or the other due to deflection of the front or rear safety bar 150 or 152, the lug 192 is pivoted with the shaft 176 and compresses one of the springs 190. Because of its compressed state, the spring 190 urges lug 192 toward the neutral position shown in FIG. 9 and thus urges the deflected safety bar to return to its neutral position. The adjustment screws 196 can be threaded in or out to vary the compression and thus the force exerted by the springs 190.

Deflection of the left and right safety bars 154 and 156 is monitored by respective limit switches 200 and 202. The switch arm of each limit switch 200 and 202 acts against the tip of an adjustment bolt 204 which is threaded through the corresponding mounting strap 162. When one of the safety bars is deflected inwardly due to encountering an obstacle, as shown for the left bar 154 in FIG. 6, the switch arm of the corresponding limit switch (the limit switch 200 in the case shown in FIG. 6) is depressed. It is noted that the opposite limit switch 202 is not affected by deflection of the left hand safety bar 154. Similarly, the arm of switch 202 is depressed when the right safety bar 156 is deflected inwardly, and the other limit switch 200 is unaffected in this situation.

Figure 10:
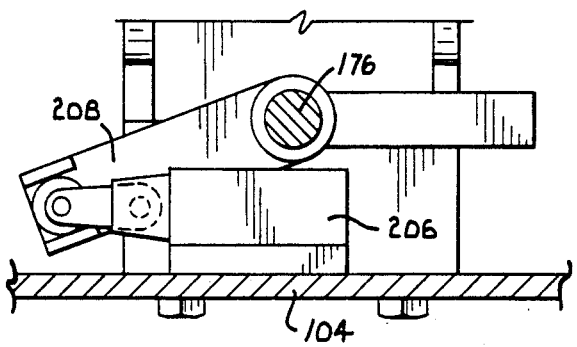
FIG. 10 is a fragmentary sectional view on an enlarged scale taken generally along line 10—10 of FIG. 8 in the direction of the arrows.
Figure 12:
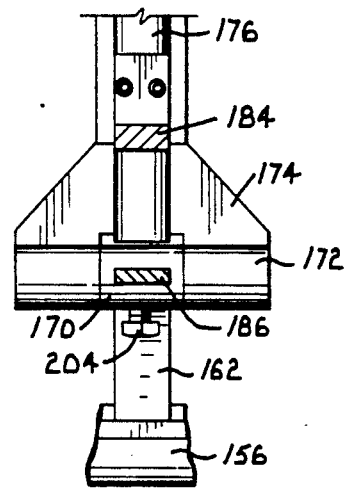
FIG. 12 is a fragmentary sectional view taken generally along line 12—12 of FIG. 11 in the direction of the arrows.
Figure 11:
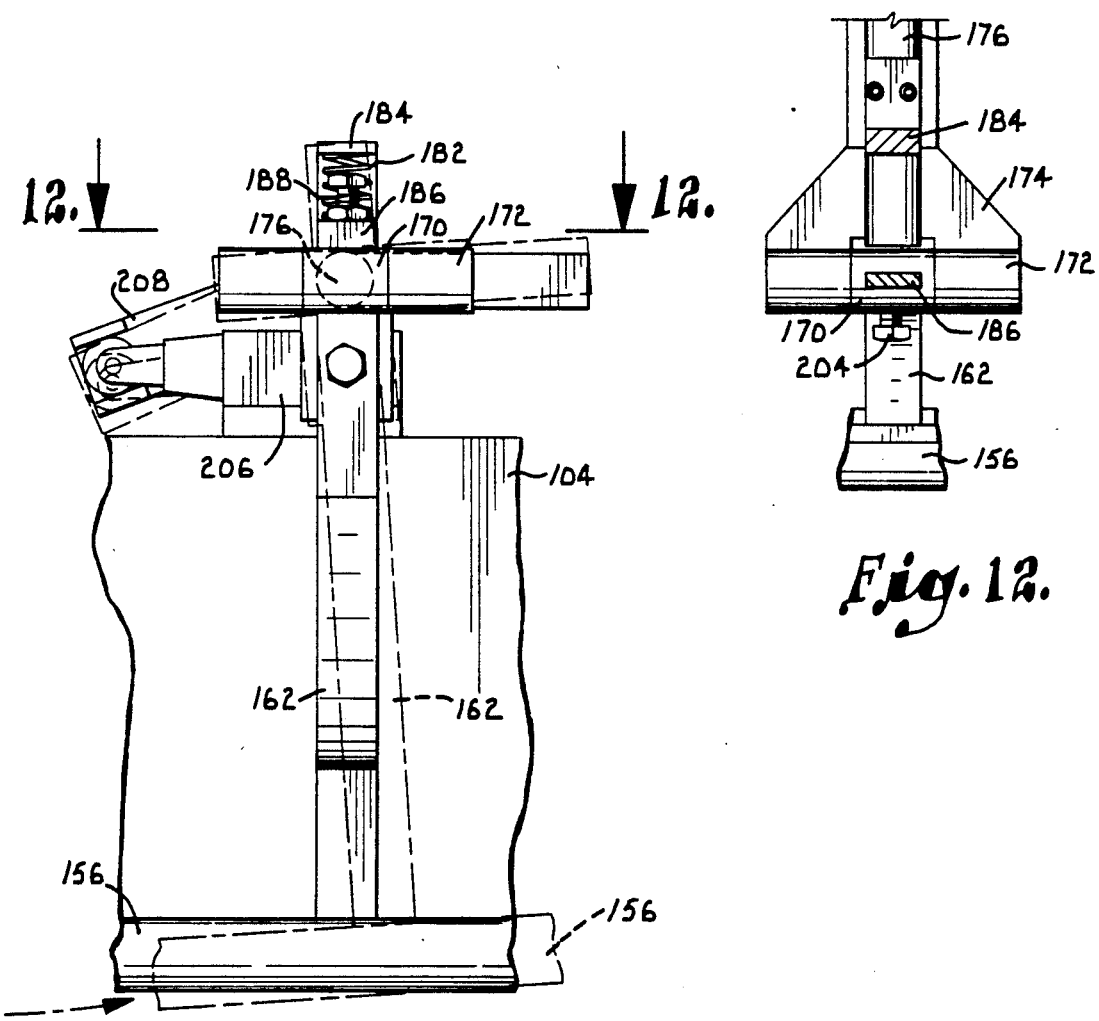
FIG. 11 is a fragmentary side elevational view on an enlarged scale taken generally along line 11—11 of FIG. 5 in the direction of the arrows.

Monitoring of the deflection of the front and rear safety bars 150 and 152 is carried out by another limit switch 206 which is mounted on the top of bracket plate 104. As best shown in FIG. 10, the switch arm of limit switch 206 is received in a channel formed in the free end of an arm 208. The arm 208 is pinned or otherwise secured to one of the shafts 176. Consequently, the arm 208 is pivoted in opposite directions upon deflection of the front and back safety bars 150 and 152, and deflection of the arm 208 in opposite directions results in pivotal movement of the arm of switch 206 in opposite directions, as exemplified by the deflection of the front bar 150 which is depicted in broken lines in FIG. 11.

Figure 14:
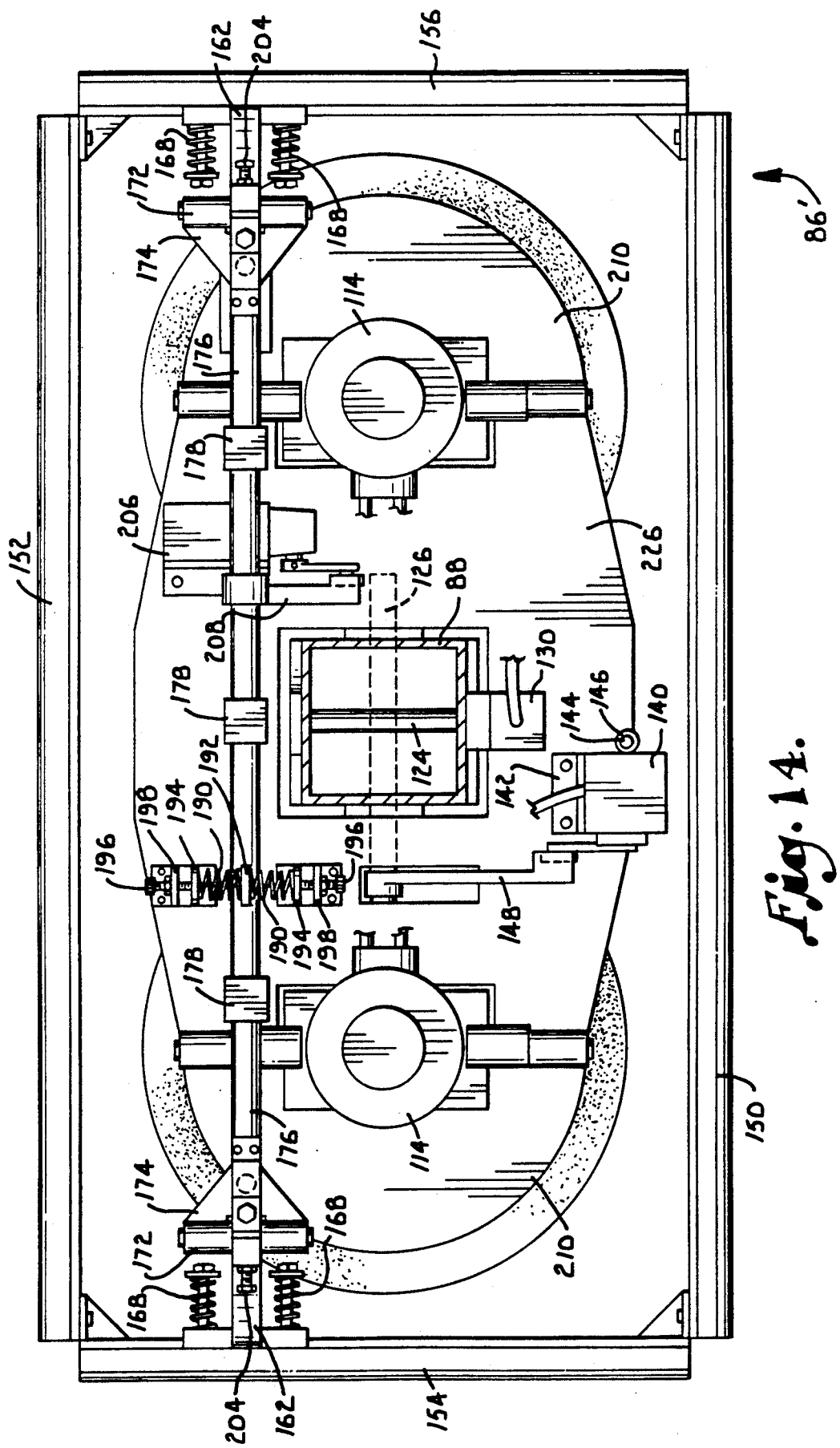
FIG. 14 is a sectional view taken generally along line 14—14 of FIG. 13 in the direction of the arrows.

FIGS. 13–15 illustrate an alternative buffer head which is generally identified by reference numeral 86' and which can be used as an alternative to the buffing head 86 described previously. The only significant respect in which the buffing head 86' differs from the buffing head 86 is that the rollers 102 are replaced by a pair of rotary disk type buffers which are identified generally by numeral 210. Each buffer 210 includes a metal plate 212 and a rubber cushion 214 secured to the metal plate. A cover 216 covers each rubber cushion 214 and may be wool or some other relatively soft material that is effective in providing buffing action to the wing 94.

The buffing head 86' is provided with substantially the same components as the buffing head 86 and the same reference numerals are used in FIGS. 13–15 to identify components which perform substantially the same functions as those previously described.

The hydraulic motors 114 drive the buffers 210 about generally vertical axes in order to rotate the pads 214, thus providing buffing action to the airplane wing 94 or other part of the aircraft which is being treated. Each of the buffers 210 is mounted to pivot or tilt to a limited extent about a horizontal pin 218. Preferably, the tilting movement is limited to approximately 10° in each direction from the neutral position shown for the buffers in FIG. 13. A sleeve 220 which is connected with each buffer 210 is fitted on pin 218 to turn on the pin, and a lug 222 which projects from each sleeve 220 carries an adjustment bolt 224. As shown in FIG. 15, the tip of bolt 224 engages a stationary plate 226 to limit tilting movement of the buffer in one direction (shown in solid lines in FIG. 15). Each sleeve 220 has a stop 228 which limits pivotal movement of the buffer in the opposite direction. By reason of the limited tilting that is permitted for the buffers 210, they are able to accommodate rough surfaces and other irregularities that may be encountered.

As previously suggested, either of the buffing heads 86 or 86' may be employed in the buffing machine of the present invention, depending upon the particular application to which the machine is to be put. It should also be noted that either type of buffing head may be equipped with virtually any number of buffers. For example, the buffing head 86 may be only one roller 102 rather than the two rollers described. More than two rollers may also be provided, although this is not normally required. In addition, the disk type buffing head 86' may be equipped with four buffing heads rather than the two described herein, and other numbers of disks may be provided as well for use in different applications. The present invention als contemplates the use of treatment heads other than the buffind heads 86 and 86'.

FIG. 16 depicts a buffing machine which is constructed for the most part in the same manner as the machine previously described. The main boom 12 and the components carried on it are the same as described previously, although a modified type of buffing head 86" (having a single large roller 102) is provided in order to buff the curved surface of an engine cowling 230 or other curved surface.

In addition, the main boom 12 is moved upwardly and downwardly differently than in the machine shown in FIG. 1, as it is contemplated that the machine of FIG. 16 will be used to buff objects that are smaller than the large airplanes that are treated by the machine of FIG. 1. In the machine shown in FIG. 16, a vertical boom or column 232 is mounted on a self-propelled unit 234 having driven wheels 236 that travel on tracks 238. A suitable motor is provided to drive the wheels 236 in order to move the machine back and forth along the tracks 238.

The main boom 12 on the machine of FIG. 16 is mounted on a carriage 240 which is driven upwardly and downwardly on the vertical column 232 by a vertical boom cylinder 242. Thus, rather than being raised and lowered by the large boom 26 of the machine shown in FIG. 1, the horizontal boom 12 in the machine of FIG. 16 is moved upwardly and downwardly by raising and lowering the carriage 240 which is in turn effected by retracting and extending the vertical boom cylinder 242.

FIG. 17 depicts a machine which is identical to that shown in FIG. 1, except that the base end of the boom assembly 26 may be raised and lowered by a scissor type lift which is generally identified by numeral 244. The lift 244 is raised by extending a hydraulic cylinder 246, and the lift is lowered by retracting the cylinder. It should be noted that the boom 12 and the components it carries to effect buffing of aircraft bodies may be carried on any of the mobile units shown in FIGS. 1, 16 and 17, as well as on additional types of machines that are or can be made available.

FIGS. 18-23 schematically illustrate the electrical system which operates and controls the machine 234 which is illustrated in FIG. 16. It should be understood that the other machines are controlled similarly.

The electrical controls include the power distribution and safety shut down circuitry illustrated in FIG. 18. The positive side of the battery of the mobile unit connects with an on/off switch 248 through a fuse 250. When the switch 248 is in the off (down) position, power is disconnected from the system.

In the on (up) position of switch 248, power from the positive side of the battery is supplied through switch 248 to a selector switch 252 and also to the power on (PO) terminal of a terminal strip 254. The selector switch 252 has a control (up) setting and a manual setting. In the manual setting, switch 248 connects through switch 252 with a manual voltage (MV) terminal of the terminal strip 254.

In the control setting of switch 252, power is supplied to an initiate control voltage switch 256 which is preferably a normally open, momentary push button type switch. The opposite side of switch 256 is connected with a relay coil 258 which controls a set of relay contacts 260. The opposite side of the coil 258 is connected with a negative (NEG) terminal of the terminal strip 254. The negative (−) side of the battery is connected to the negative terminal of strip 254. Also extending from connection with switch 256 is a line 262 that extends to connection with a control voltage (CV) terminal of strip 254. The relay contacts 260 are located in a conductor that extends from switch 252 to a switch voltage (SV) terminal on strip 254.

The three safety bar limit switches 200, 202 and 206 are connected in parallel with one another between the PO terminal and a relay coil 264 which has its opposite side connected with the negative battery terminal. The relay coil 264 controls three sets of contacts 266, 268 and 270 which are in the positions shown when coil 264 is deenergized. If any of the limit switches 200, 202 or 206 is tripped, the PO terminal is connected through the tripped limit switch with the relay coil 264 to energize it and switch all of the contacts 266, 268 and 270. When contacts 266 are switched, the SV terminal of strip 254 is connected with the relay coil 264. When contacts 268 are switched, they break the normally completed circuit path between the CV and SV terminals of strip 254. When contacts 270 are switched, a circuit is established through an indicator lamp 272 which provides a visual indication that control voltage is absent when the indicator is energized. The SV and MV terminals are connected through a diode 274 which allows current to flow from the SV terminal to the MV terminal but not in the opposite direction.

The floating boom limit switch 96 is connected in series with another limit switch 276 which is tripped when the carriage 240 (see FIG. 16) is at the upper limit of its travel. One side of the series connected limit switches 96 and 276 connects with the PO terminal of strip 254, and the other side connects through a diode 278 with the relay coil 264. Whenever both of the limit switches 96 and 276 are tripped at the same time, a current path is established through coil 264 and also through an indicator light 280 which is then energized to provide a visual warning that the machine has reached its up limit.

Figure 19:
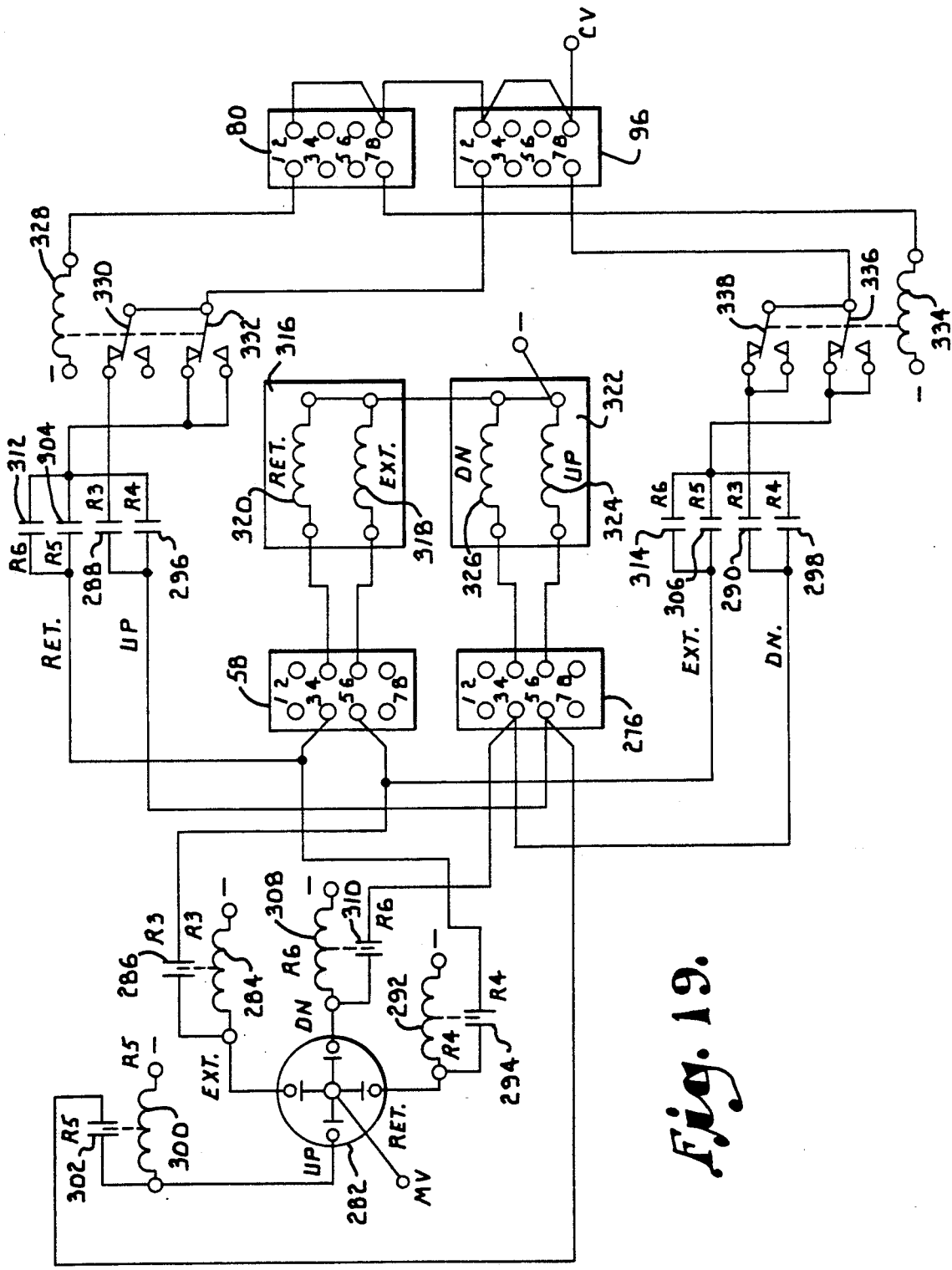
FIG. 19 is an electrical schematic of the control system that controls up and down movement and extension and retraction of the main boom of the buffing machine.

Referring now to FIG. 19, a manually operated switch 282 controls the extension and retraction of the main boom 12 as well as the up and down movement of the carriage 240. Switch 282 receives power from the MV terminal of the terminal strip 254 and can be moved to four different positions. An extend position of switch 282 provides a command for extension of the main boom 12 and a retract position commands retraction of boom 12. An up setting of switch 282 commands upward movement of the carriage 240 and a down setting commands downward movement of the carriage 240.

In the extend setting of switch 282, power is supplied through the switch from the MV terminal to energize a relay coil 284 having three sets of normally open contacts 286, 288 and 290. The contacts 286 are connected in a line which leads from the extend terminal of switch 282 to the number five terminal of limit switch 58.

Connected between the retract terminal of switch 282 and the negative side of the battery is another relay coil 292 having three sets of normally open contacts 294, 296 and 298. The contacts 294 are provided in a conductor which extends from the retract terminal of switch 282 to the number 3 terminal of limit switch 58.

The up terminal of switch 282 connects with a relay coil 300 having three sets of normally open contacts 302, 304 and 306. Coil 300 is normally deenergized but is energized when switch 282 is positioned in the up setting. Contacts 302 then complete a circuit from the up terminal of switch 282 to the number 5 terminal of limit switch 276.

The final terminal of switch 282 is the down terminal which controls another relay coil 308 having three sets of normally open contacts 310, 312 and 314. Contacts 310 are in a conductor that extends from the down terminal of switch 282 to the number 3 terminal of limit switch 276.

A solenoid unit 316 which controls the extension and retraction of the main boom 12 includes an extend solenoid 318 and a retract solenoid 320. The extend solenoid 318 is connected between the number 6 terminal of limit switch 58 and the negative side of the battery. The retract solenoid 320 is connected between the number four terminal of switch 58 and the negative battery terminal.

Another solenoid unit 322 controls the up and down movement of carriage 340. Up and down solenoids 324 and 326 are connected between the negative battery terminal and the respective number six and number four terminals of limit switch 276.

With continued reference to FIG. 19, the CV terminal connects with the number two and number eight terminals of both limit switches 80 and 96. The number one terminal of switch 80 connects with ground through a relay coil 328 having two sets of contacts 330 and 332. One side of each set on contacts 330 and 332 connects with the number one terminal of limit switch 96. In the normal position of contact 330 shown in FIG. 19, it connects with the contacts 288, the opposite side of which connects with an up line extending to the number 5 terminal of limit switch 276. One side of the contacts 332 connects in both positions with one side of each set of contacts 296, 304 and 312. The opposite side of contacts 296 connects with the up line and the number five terminal of limit switch 276. The opposite sides of the other sets of contacts 304 and 312 connect with a retract line which extends to the number three terminal of limit switch 58.

The number seven terminal of limit switch 80 connects with the negative battery terminal through a relay coil 334 which controls two sets of contacts 336 and 338. One side of each set of contacts 336 and 338 is connected with the number seven terminal of limit switch 96. The other side of the contacts 338 is connected in both positions with the contacts 290 which are connected on their opposite sides with a down line that extends to connection with the number three terminal of limit switch 276. The other set of contacts 336 connect on one side with contacts 298, 306 and 314. Contacts 298 connect through the down line with the number three terminal of limit switch 276. The opposite sides of the other contacts 306 and 314 connect with an extend line which leads to connection with the number 5 terminal of limit switch 58.

Referring now to FIG. 20, the MV terminal of strip 254 is connected with a switch 340 that serves to control the rotary actuator 66. Switch 340 is a manual switch having a clockwise setting and a counterclockwise setting. The CV terminal of the terminal strip 254 connects with the number one and number three terminals of limit switch 68. The number two terminal of limit switch 68 connects with one side of a set of relay contacts 342 which are controlled by a relay coil 344 having two additional sets of contacts 346 and 348. Connected with the other side of the contacts 342 when they are in the position shown in FIG. 20 is a conductor that connects with the negative side of the battery through another relay coil 350 having three sets of contacts 352, 354 and 356. The number four terminal of limit switch 68 connects with one side of contacts 352, and the other side of these contacts connect with the negative side of the battery through coil 344. The clockwise terminal of switch 340 connects with one side of contacts 348, as does the number two terminal of limit switch 30. The same side of the contacts 348 are connected through a diode 358 with one side of the contacts 356. The counterclockwise terminal of switch 340 connects with one side of the contacts 346 as does the number eight terminal of limit switch 130. Extending from the same side of the contacts 346 is a conductor which extends through a diode 360 with one side of the contacts 354.

A solenoid unit 362 which controls the rotary actuator 66 includes a clockwise solenoid 364 and a counterclockwise solenoid 366. One side of each solenoid 364 and 366 is connected with the negative side of the battery. The opposite side of solenoid 364 connects with relay contacts 46 and also with relay contacts 356. The other side of the counterclockwise solenoid 366 is connected with relay contacts 48 and also with relay contacts 354.

FIG. 21 depicts the control circuitry for each of the buffer drive motors 114. A pair of switches 368 and 370 are arranged in series between the MV terminal and a solenoid unit 372. Switch 368 is an on/off switch for the buffer power circuit and allows power to be delivered to the solenoid 372 when in the on position shown in FIG. 21. In the off position of switch 368, power can be supplied to the solenoid unit 372 only through a normally open push button switch 374 which connects on one side with the MV terminal and on the other side with switch 370. The solenoid unit 372 has a clockwise solenoid 376 and a counterclockwise solenoid 378, each of which connects on one side with the negative terminal of the battery. When switch 370 receives power, either the clockwise or counterclockwise solenoid 376 or 378 is activated, depending upon the setting of switch 370. When the clockwise solenoid 376 is energized, the drive motors 114 rotate the buffers in one direction, while the buffers are rotated in the opposite or counterclockwise direction when the counterclockwise solenoid 378 is energized. The provision of the buffer test switch 374 allows the buffer motors to be tested through momentary depression of the push button switch 374 while the main buffing power switch 368 is in its off position.

FIG. 22 depicts the control circuit for the pivot boom 72 and the circuitry for adjusting the cylinder 140 which controls limit switch 136. A three position switch 380 includes a clockwise setting, a counterclockwise setting and an off position in which the switch is normally maintained by a spring. The switch 380 connects with the MV terminal, and its clockwise terminal connects with a clockwise solenoid 382 which causes the rotary actuator 78 (or the pivot cylinder 84) to actuate in a direction to pivot the pivot boom 72 outwardly. the counterclockwise terminal of switch 380 connects with one side of a counterclockwise solenoid 384 which, when energized, causes the rotary actuator 78 (or the pivot cylinder 84) to actuate in a direction to pivot the extension boom 72 outwardly. The opposite side of each of the solenoids 382 and 384 connects with the negative terminal of the battery.

The CV terminal of the terminal strip 254 connects with the number of two and number eight terminals of the limit sitch 136. The number one terminal of limit switch 136 connects with the counterclockwise solenoid 384, while the number seven terminal of the limit switch 136 connects with the clockwise solenoid 382.

The adjustment cylinder 140 is controlled by a switch 386 which connects with the CV terminal and which is normally in an off position. The switch 386 has two other positions to which it may be manually moved. In one position, the CV terminal is connected through the switch with an extend solenoid 388, and in the other position, a retract solenoid 390 connects through the switch with the CV terminal. The solenoids 388 and 390 are connected on their opposite sides with the negative terminal of the battery. In this manner, the cylinder 140 can be selectively extended and retracted to control the extent of tilting permitted on the buffer head, and it is contemplated that the switch 386 will be used to adjust the cylinder until the buffing head has no tendency to "chatter".

FIG. 23 depicts the control circuitry for the driving and steering of the mobile unit 234. A selector switch 392 connects with the CV terminal and has manual and automatic settings. In the manual setting, the power from the CV terminal is unable to pass through the switch 392. However, in the automatic setting of switch 392, the CV terminal is connected with the number three and number five terminals of a limit switch 394 which limits the forward and rearward movement of the mobile unit 234. The number one terminal of switch 394 is connected with the reverse terminal of another switch 396 which connects with the MV terminal and is normally held in an off position. The other terminal of switch 396 is a forward terminal which connects with the number seven terminal of limit switch 394.

The number one and number four terminals of switch 394 are connected, and the number six and number eight terminals are also connected. The number two terminal connects with a reverse solenoid 398 which drives the wheels of the mobile unit 234 in a reverse direction when the solenoid is energized. The number eight terminal of limit switch 394 connects with a forward solenoid 400 which, when energized, drives the wheels of the mobile unit in the forward direction.

A steering switch 402 connects with the MV terminal and is normally urged to an off position. Switch 402 has a left terminal which connects with a left turn solenoid 404. When solenoid 404 is activated, the wheels of the mobile unit 234 are turned to the left. Another solenoid 406 is connected with the right terminal of switch 402 and acts to turn the wheels of the mobile unit to the right when energized.

Figures 24, 25:
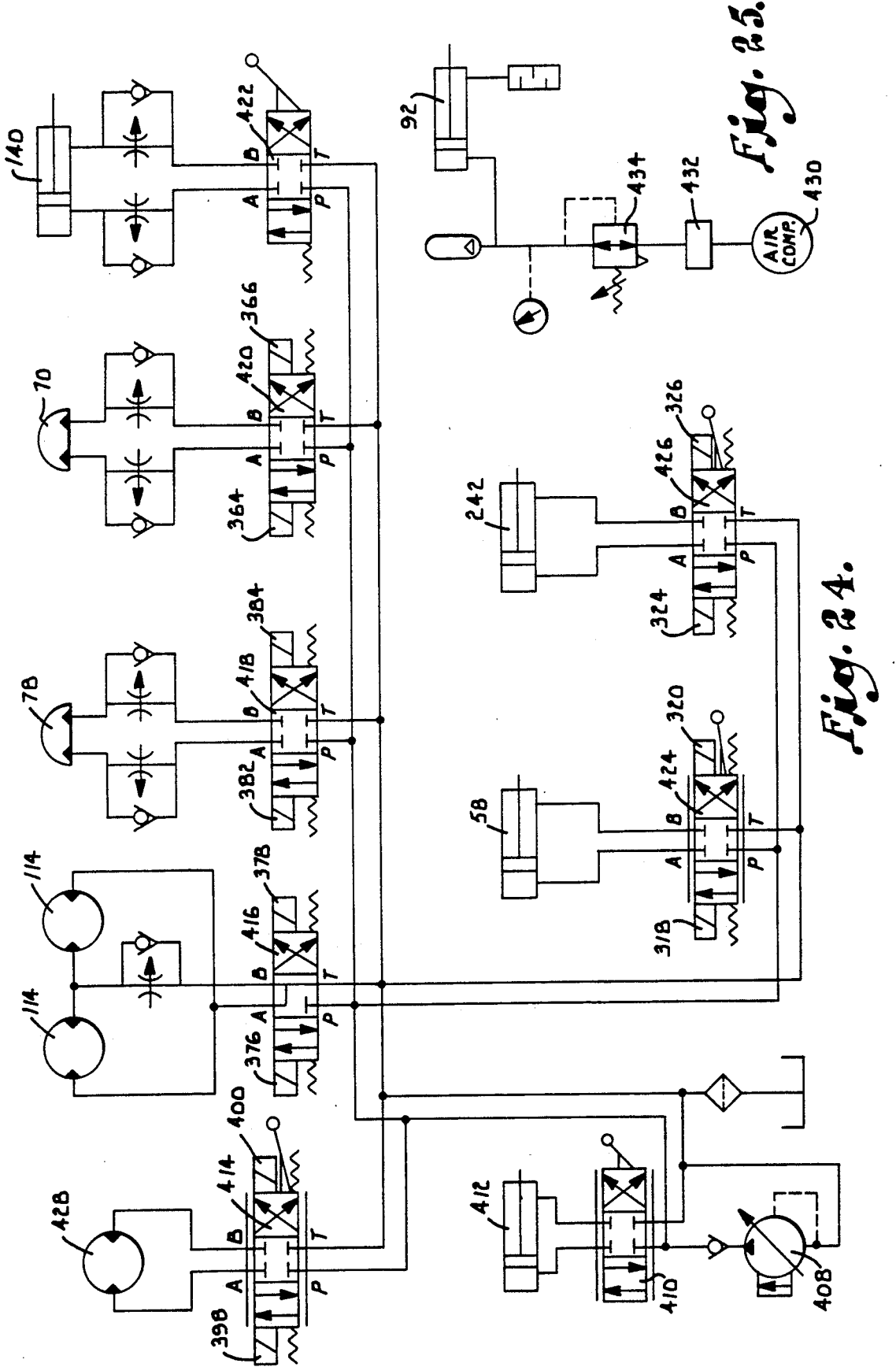
FIG. 24 is a schematic diagram of the hydraulic system for controlling the various functions of the buffing machine.
FIG. 25 is a schematic diagram of the pneumatic circuit which maintains a constant outward force on the floating boom section of the pivot boom.

FIG. 24 depicts the hydraulic circuit which controls the various hydraulically powered components of the machine. A hydraulic pump 408 applies fluid to various three position valves which control the fluid flow to and from the various drive motors, hydraulic cylinders, and hydraulic actuators. Connected with the supply line of the pump is a three position valve 410 which controls the flow of hydraulic fluid to and from a steering cylinder 412 which is used to steer the wheels of the mobile unit 234. The left and right solenoids 404 and 406 control cylinder 410. The supply line of the pump 408 similarly connects with three position valves 414, 416, 418, 420, 422, 424 and 426. Valve 414 controls the flow to and from a hydraulic drive motor 428 which drives the wheels of the mobile unit 234. The valve 414 is controlled by the reverse solenoid 398 and by the forward solenoid 400. Similarly, valve 416 controls the flow of hydraulic fluid to and from the buffer motors 114. The solenoids 376 and 378 control the position of valve 416. Valve 418 is controlled in position by solenoids 382 and 384, and the position of valve 418 in turn determines the condition of the rotary actuator 78. Valve 420 is similarly controlled by solenoids 364 and 366 in order to determine the condition of the rotary actuator 70.

Cylinder 422 controls the adjustment cylinder 140 and is controlled by the solenoids 388 and 390 in the manner indicated previously. Valve 424 controls the main boom cylinder 58 and is controlled by solenoids 318 and 320. The final hydraulic valve 426 controls the cylinder 242 which moves the main boom 26 up and down. Solenoids 324 and 326 control the position of valve 426.

Referring now to FIG. 25, the pneumatic cylinder 92 acts on the floating boom 88 in a manner to apply a substantially constant downward pressure on it. An air compressor 430 supplies air to a pressure regulator 432 which in turn supplies air at a substantially constant pressure through an adjustable relief valve 434 which connects with the pneumatic cylinder 92.

The various multiple terminal limit switches which are included in the machine are commercially available limit switches in which the different opposing terminals are connected and disconnected according to the condition of the limit switch. In one limiting position of each limit switch, terminals three and four are connected with one another, terminals seven and eight are connected with one another and the remaining terminals are disconnected from one another. In the other limiting position, the number one and number two terminals are connected with one another, the number five and number six terminals are connected with one another and the remaining terminals are disconnected from one another. At any position between the limiting positions, terminals three and four are connected with one another, terminals five and six are connected with one another and the remaining terminals are disconnected from one another.

In operation of the buffing machine, the machine is first maneuvered to a position where the buffing head 86 is located and oriented as desired. To accomplish this, the system power switch 248 (FIG. 18) is switched to its on position, and switch 252 is switched to the manual position. Then, power is supplied only to the PO and MV terminals of the terminal strip 254. The CV terminal does not receive power, and the automatic functions of the buffing machine cannot operate automatically in this condition.

The mobile unit 234 is driven to the desired position, and the carriage 240 and main boom 12 are manually controlled so that the buffer head is positioned as desired. Referring particularly to FIG. 19, switch 282 may be manually positioned in the up position in order to raise the carriage 240 and the main boom 12. In the up position of switch 282, the MV terminal connects through the switch with relay coil 300, thus energizing it and closing the contacts 302. Then, power is applied to the number five terminal of switch 276. If the carriage is between its up and down limiting positions, the number five and number six terminals are connected, and the up solenoid 324 is then energized to raise the carriage 240.

The carriage continues to move upwardly as long as switch 282 is held in the up position. However, when the carriage reaches the upward limit of its travel, the number five and number six terminals are automatically disconnected and solenoid 324 is deenergized to discontinue upward movement of the carriage.

Conversely, when switch 282 is held in the down position, relay coil 308 is energized, its contacts 310 close, and power is supplied to the number three terminal limit switch 276. If the carriage is in any position other than fully down, the number three and number four terminals of limit switch 276 are connected and the down solenoid 326 is energized to move the carriage downwardly.

Downward movement of the carriage continues so long as switch 282 is held in the down position or the down limit is reached. When the fully down position of the carriage is reached, terminals three and four of limit switch 276 automatically disconnect and thus deenergize solenoid 326 to prevent further downward movement of the carriage.

The main boom 12 is extended and retracted in a similar fashion. When switch 282 is moved to the extend setting, relay coil 284 is energized and its contacts 286 close. Then, a circuit is completed to the number five terminal of limit switch 58. If the main boom 12 is in any position other than fully extended, the number five and number six terminals of switch 58 will be connected and the extend solenoid 318 will be energized to effect extension of the main boom 12. The main boom continues to extend so long as switch 282 is held in the extend position or the extended limit is reached. When the fully extended position of the main boom is reached, terminals five and six of limit switch 58 are disconnected and the extend solenoid 318 is automatically deenergized.

When switch 282 is in the retract position, relay coil 292 is energized and its relay contacts 294 are closed to supply current to the number three contact of limit switch 58. Since the number three and number four contacts of limit switch 58 are connected in any position except the fully retracted position of the main boom, the retract solenoid 320 is energized. When the boom is fully retracted, the number three and number four terminals of limit switch 58 are disconnected to prevent further energization of solenoid 320.

Referring now to FIG. 22, the pivot boom 72 may be pivoted inwardly or outwardly through use of switch 380. When switch 380 is set in the clockwise position, the MV terminal is connected through the switch with the clockwise solenoid 382 which is then energized to pivot the pivot boom inwardly. Conversely, when switch 380 is in the counterclockwise setting, the counterclockwise solenoid 384 is energized to pivot the pivot boom outwardly. The pivotal movement of boom 72 continues until the switch 380 is released (at which time the switch returns to its normal off position) or until the limiting position of the pivot boom is reached.

The buffers 102 must be deliberately turned on by turning switch 368 (FIG. 21) to the on position, and the direction of rotation of the buffers can be controlled by the setting of switch 370. Switch 374 permits the buffers to be tested before they are actually positioned to the work surface.

In this manner, the manual controls allow the machine to be driven to the desired position and allow the buffing head to be positioned and oriented as desired on the work surface which is to be buffed or otherwise treated. Because power to the CV terminal of strip 254 is blocked, the automatic functions of the machine are made inoperative during initial set up of the buffing head.

The automatic mode of operation of the machine may then be initiated by placing switch 252 (FIG. 18) in the control position to make battery power available to the push button switch 256 and also to the relay contacts 260. Switch 256 may then be depressed, and this momentarily completes a circuit through relay coil 258 to the negative battery terminal. This energizes coil 258 and switches the contacts 260 so that battery voltage is applied through them to the SV terminal of strip 254 and through diode 210 to the MV terminal. Voltage is also supplied from the SV terminal through relay contacts 268 to the CV terminal, and from the CV terminal along line 262 to the relay coil 258, thus latching the relay coil 258 in the energized condition. Latching of the relay coil latches battery power to the SV, CV and MV terminals (as well as to the PO terminal which receives power whenever switch 248 is in the on position).

If the buffing head is positioned on a generally horizontal surface, the pivot boom 72 is in a generally vertical position. Buffing of the work surface is carried out by extending or retracting the main boom 12 to force the buffing head to travel in or out along the work surface. This action is effected by the operator positioning switch 282 in the extend or retract position in order to extend or retract the main boom 26 as desired.

As the buffer travels in and out over the work surface and the contour of the work surface rises or falls, the floating boom rises and falls to accommodate the varying contour, as permitted by the pneumatic cylinder 92 which maintains a substantially constant pressure on the work surface at all times.

With reference to FIG. 19 in particular, if the floating boom 88 is retracted to its limiting position by a rising surface that is being buffed, the number one and number two terminals of the limit switch 96 are connected, thus connecting the CV terminal with the contacts 330 and 332. Since coil 328 is deenergized, the CV terminal is connected through contacts 330 and 332 with relay contacts 288 and 296. If the main boom 26 is operating in the extend mode, relay coil 284 is energized and contacts 288 are closed. If the main boom is operating in the retract mode, relay coil 292 is energized and contacts 296 are closed. In either event, power is supplied to the number five terminal of limit switch 276. If the carriage 240 is not in the fully up position, terminals five and six of limit switch 276 are connected and the up solenoid 324 is then energized to raise the carriage. After the carriage has been raised sufficiently, the floating boom 88 is extended enough that the number one and two terminals of limit switch 96 are disconnected, thus cutting off the CV voltage to the up solenoid 324.

Conversely, the floating boom 88 may drop to its fully extended position due to a falling contour on the surface that is being buffed. Then, the number seven and eight contacts of limit switch 96 are connected and the CV terminal is connected through them to relay contacts 336 and 338 and through these contacts to relay contacts 298 and 290. Again, one of the relay coils 284 or 292 is energized so that one set of contacts 290 or 298 are closed in order to supply power to the number three terminal of limit switch 276. If the carriage 240 is in anything other than the fully down position, terminals three and four of limit switch 276 are connected, and the down solenoid 326 is then energized to move the carriage downwardly. This causes the floating boom 88 to retract until the number seven and number eight terminals of limit switch 96 are disconnected in order to deenergize the down solenoid 326.

In this manner, the floating boom 88 and the buffing head 86 that it carries are able to traverse contoured surfaces, and the carriage 240 is automatically driven upwardly or downwardly when the floating boom 88 is fully retracted or fully extended.

If the surface that is being buffed is more nearly vertical, the pivot boom 72 will be pivoted outwardly so that the buffing head 86 is able to travel along the work surface. When buffing a surface of this type, the buffing is carried out by moving the carriage 240 up and down through operation of the switch 282. Again, the floating boom 88 is able to extend and retract within its limits in order to accommodate contoured surfaces. If a surface that falls away from the buffing head causes the floating boom 88 outwardly to the fully extended position, terminals seven and eight of limit switch 96 are connected to supply power to relay contacts 336 and to relay contacts 306 and 314. Because switch 282 is in either in the up or down position, relay coil 302 or relay coil 308 is energized, and either the contacts 306 or the contacts 314 are closed so that power is supplied through the closed relay contacts to the number five terminal of limit switch 58. Unless the main boom 26 is fully extended, terminals five and six of limit switch 58 are connected to provide a current path for energizing the extend solenoid 318 which then extends the main boom 26. When the floating boom 88 is retracted sufficiently, the number seven and number eight terminals of limit switch 96 open to deenergize the extend solenoid 318.

Conversely, the surface that is being treated may cause the floating boom 88 to fully retract while the machine is being operated to move the buffing head up and down through use of switch 282. When the floating boom 88 is fully retracted, terminals one and two of limit switch 96 close, and power is supplied to relay contacts 332 and through them to contacts 304 and 312. One set of contacts 304 or 312 will be closed due to the energization of either relay coil 300 or relay coil 308. Power is then supplied to the number three terminal of limit switch 58 which is at this time connected with the number four terminal unless the main boom is fully retracted. If it is not, the retract solenoid 320 will be energized to retract the main boom until the floating boom 88 has extended far enough to open the number one and number two terminals of limit switch 96 in order to deenergize the retract solenoid.

Referring now to FIG. 20 in particular, the rotary actuator can be actuated in either direction by operating the manual switch 340. If the limit switch 68 is located on the raised surface 70, terminals one and two of limit switch 68 are closed, and the CV terminal is connected through limit switch 68 and relay contacts 342 with relay coil 350 to energize it. If a clockwise command is then given by placing switch 340 in clockwise position, the MV terminal is connected through switch 340 and diode 358 with relay contacts 356. Because relay coil 350 is now energized, contacts 356 direct power to the clockwise solenoid 364, thus causing the rotary actuator to turn the rotary boom 64 in a clockwise direction. If the rotary boom is turned far enough in the clockwise direction that the limit switch 68 drops off of the raised surface 70, terminals one and two are disconnected and terminals three and four are connected. The disconnection of terminals one and two deengergizes the relay coil 350, and this in turn causes the clockwise solenoid 364 to deenergize. Closing of terminals three and four of limit switch 68 results in the application of voltage from the CV terminal through relay contacts 352 to relay coil 344, thus energizing it. If switch 340 is still in the clockwise position, the MV terminal is connected through switch 340 and through the switched relay contacts 348 to the counter-clockwise solenoid 366, resulting in the rotary actuator turning in a counterclockwise direction. This will move the limit switch 68 back on the raised surface and cause a "jittering" back and forth movement of the rotary actuator at the clockwise end of the raised surface 70.

If the switch 340 is placed in the counterclockwise position with limit switch 68 on the raised surface 70, the MV terminal is connected through switch 340, diode 360, and the switched relay contacts 354 with the counterclockwise solenoid 366. This causes the actuator 66 to rotate the rotary boom 64 in a counterclockwise direction.

Counterclockwise rotation continues until the counterclockwise end of the raised surface 70 is reached, at which time the limit switch 68 moves off of the raised surface and causes terminals one and two to disconnect as terminals three and four are simultaneously connected. The disconnection of terminals one and two of limit switch 68 causes relay coil 350 to deenergize, while the connection of terminals three and four causes relay coil 344 to energize. Then, the counterclockwise signal from switch 340 is directed through the switched relay contacts 346 to the clockwise solenoid 364. Again, the rotary actuator effects a jittering motion at the counterclockwise end of the raised surface 70.

This control arrangement limits the rotation of actuator 66 to an arc of 180°. Because of the jittering motion that occurs at either end of the rotational arc, the operator is given a signal that further rotation away from the raised surface is prohibited and that the only rotation that is allowed is back onto and along the raised surface 70. He can then actuate switch 340 appropriately to move the buffing head to the desired position.

With continued reference to FIG. 20, terminals one and two of limit switch 130 are connected in one limiting position, and terminals seven and eight are connected in the other limiting position. When terminals one and two are connected due to the buffing head being pulled in one direction, the CV terminal is connected through limit switch 130 to relay contacts 348 and also to relay contacts 356 through diode 358. Depending upon whether the limit switch 68 is on or off of the raised surface 70, contact 348 or 356 will be switched to direct power to either the counterclockwise solenoid 366 or the clockwise solenoid 364. Consequently, the rotary actuator 66 is automatically controlled to prevent the buffing head 86 from being excessively cocked, as sensed by the limit switch 130. If the buffing head 130 is cocked in the opposite direction to the limiting position, terminals seven and eight are connected to connect the CV terminal with relay contacts 346 and through diode 360 with relay contacts 354. Again, the proper solenoid 364 or 366 is energized to activate rotary actuator 66 in the proper directional mode to counteract the undue cocking of the buffing head 86.

Referring now to FIG. 22, if the buffing head 86 is pivoted excessively in either of the directions sensed by limit switch 136, terminals one and two or terminals seven and eight are connected and this automatically activates one of the solenoids 384 or 382, thus pivoting the pivot boom 72 in the proper direction to counteract the excessive tilting of the buffing head 86. This action assures that both of the buffers 102 are in contact with the work surface that is being buffed and prevents "chattering" of the buffing head.

With reference now to FIG. 18, the safety limit switches 200, 202 and 206 effect automatic shut down of the control system in the event that any of the safety bars is deflected due to the buffing head encountering an obstacle. If this should occur, terminals one and two of one of the limit switches are connected to connect the PO terminal with the obstacle relay coil 264, thus energizing it. When relay coil 264 is energized, its relay contacts 268 are switched to remove control voltage from the CV terminal of strip 254. At the same time, relay coil 258 is deenergized to lock out the CV terminal. The indicator light 272 is energized through the limit switch that was tripped and relay contacts 266 and 270, thus providing a visual indication that the control voltage is off. Diode 278 blocks the PO terminal from the up limit warning light 280.

Before control voltage can be stored, it is necessary for the operator of the machine to intentionally depress the push button switch 256. As a consequence, once an obstacle is encountered by the buffing head, the operator must make a conscious effort to restore control voltage, and he will do so only after the buffing head is moved away from the obstacle. It is noted that power from the PO terminal is made available to the MV terminal through the tripped limit switch, relay contacts 266, the SV terminal and diode 274. This permits the operator to manually control the machine in a manner to move the buffing head away from the obstacle until the limit switch reverts to the neutral position. Consequently, quick corrective action can be taken. It is also noted that the selector switch 252 may be switched to the manual setting to provide power to the MV terminal in order to move the buffing head well away from the obstacle if necessary.

If the floating boom is fully retracted and the carriage 240 is in the fully up position simultaneously, terminals one and two of limit switch 96 will be connected and terminals seven and eight of limit switch 276 will be connected. Then, the obstacle relay coil 264 is energized through the closed terminals of the limit switches and diode 278, thus automatically shutting down the machine in the manner described previously in connection with the safety limit switches. At the same time the up limit warning light 280 is energized through limit switches 96 and 276.

Although the machine of the present invention has been described in connection with the buffing of aircraft, the buffing head can be replaced with another type of treatment head or applicator head in order to allow it to carry out other types of treatment, including sanding and the application of paint of other finish materials.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, we claim:

1. Aircraft body treatment apparatus comprising:
   an elongate main boom having inboard and outboard ends and a base boom section at said inboard end and an extension boom section at said outboard end, said extension boom section being mounted to said base boom section for extension and retraction relative thereto;
   means for mounting said main boom in a manner allowing said outboard end to be raised and lowered;
   means for effecting selective raising and lowering of said outboard end;
   means for effecting selective extension and retraction of said extension boom section;
   a rotary boom mounted on said extension boom section for ration about a rotational axis substantially coinciding with the longitudinal axis of said main boom;
   means for selectively adjusting said rotary boom about said rotational axis;
   a pivot boom mounted on said rotary boom for pivotal movement about a pivot axis oriented substantially perpendicular to said rotational axis;
   a floating boom carried on said pivot boom for telescopic extension and retraction relative thereto;
   means for urging said floating boom in a direction to extend relative to said pivot boom;
   means for selectively pivoting said pivot boom about said pivot axis; and
   a treatment head carried on said floating boom and applicable to the aircraft body to effect a preselected treatment thereof.

2. Apparatus as set forth in claim 1, wherein said means for mounting said main boom comprises a mobile unit on which said main boom is mounted in a manner allowing said outboard end to be raised and lowered.

3. Apparatus as set forth inc claim 1, including means for mounting said treatment head on said floating boom for pivotal movement relative thereto about first and second mutually perpendicular pivot axes, said first pivot axis being substantially parallel to said rotational axis and said second pivot axis being substantially parallel to said pivot axis of the pivot boom.

4. Apparatus as set forth in claim 3, including:
means for establishing limiting positions of said treatment head in opposite directions about said first pivot axis; and
means operable when said treatment head reaches either of said limiting positions for activating said selective adjustment means in a manner to adjust said rotary boom about said rotational axis in a direction to effect movement of said treatment head about said first pivot axis in a pivotal direction away from the limiting position the treatment head has reached.

5. Apparatus as set forth in claim 4, including:
means for establishing limiting positions of said treatment head in opposite directions about said second pivot axis; and
means operable when said treatment head reaches either of said limiting positions about said second axis for activating said selective pivoting means in a manner to pivot said pivot boom about its pivot axis in a direction to effect movement of the treatment head about said second pivot axis in a pivotal direction away from the limiting position the treatment head has reached about said second axis.

6. Apparatus as set forth in claim 5, including:
safety bar means extending around said treatment head at a location to engage an obstacle encountered by the treatment head;
means for sensing when said safety bar means engages an obstacle; and
means for disabling said means for effecting selective raising and lowering, said means for effecting selective extension and retraction, said selective adjusting means and said selective pivoting means when said safety bar means engages an obstacle.

7. Apparatus as set forth in claim 3, including:
means for establishing limiting positions of said treatment head in opposite directions about said second pivot axis; and
means operable when said treatment head reaches either of said limiting positions about said second axis for activating said selective pivoting means in a manner to pivot said pivot boom about its pivot axis in a direction to effect movement of the treatment head about said second pivot axis in a pivotal direction away from the limiting position the treatment head has reached about said second axis.

8. Apparatus as set forth in claim 1, including:
safety bar means extending around said treatment head at a location to engage an obstacle encountered by the treatment head;
means for sensing when said safety bar means engages an obstacle; and
means for disabling said means for effecting selective raising and lowering, said means for effecting selective extension and retraction, said selective adjusting means and said selective pivoting means when said safety bar means engages an obstacle.

9. Apparatus as set forth in claim 1, including:
means for establishing an extension limit and a retraction limit for said floating boom relative to said pivot boom;
means operable automatically when said floating boom reaches its extension limit for actuation said selective raising and lowering means in a manner to effect lowering of said outboard end, thereby lowering said main boom to retract the floating boom, and;
means operable automatically when said floating boom reaches its retraction limit for activating said selective raising and lowering means in a manner to effect raising of said outboard end, thereby raising said main boom to extend the floating boom.

10. Apparatus as set forth in claim 9, including:
means for establishing an upper limit for said outboard end of the main boom; and
means for disabling said means for effecting selective extension and retraction, said selective adjusting means and said selective pivoting means when said upper limit is reached at the same time as said floating boom is at its retraction limit.

11. Apparatus for buffing an aircraft body, said apparatus comprising:
a mobile unit;
an elongate main boom having inboard and outboard ends, said main boom being extensible and retractable and having said inboard end mounted on said mobile unit in a manner to be raised and lowered;
first power means for raising and lowering said main boom;
second power means for extending and retracting said main boom; a rotary boom mounted on the outboard end of said main boom for rotation about a rotational axis substantially coinciding with the longitudinal axis of said main boom;
third power means for rotating said rotary boom about said rotational axis;
a pivot boom mounted on said rotary boom for pivotal movement about a pivot axis oriented substantially perpendicular to said rotational axis;
fourth power means for pivoting said pivot boom about said pivot axis;
a floating boom extending from said pivot boom and supported for telescopic extension and retraction relative thereto;
a buffing head carried on said floating boom and including at least one buffer engageable with the aircraft body for buffing thereof; and
fifth power means for driving said buffer.

12. Apparatus as set forth in claim 11, including:
means for sensing when the buffing head encounters an obstacle; and
means responsive to said sensing means for disabling all of said power means when the buffing head encounters an obstacle.

13. Apparatus as set forth in claim 11, including:
means for establishing extension and retraction limits of said floating boom relative to said pivot boom;
means for establishing an automatic mode of operation; and
means operable in the automatic mode of operation for activating said first power means to effect lowering of the main boom at the extension limit of the floating boom and to effect raising of the main boom at the retraction limit of the floating boom.

14. Apparatus as set forth in claim 13, including:
means for establishing upper and lower limits of said main boom; and
means for interrupting the automatic mode of operation when the main boom is at its upper limit and the floating boom is at its retraction limit.

15. Apparatus as set forth in claim 11, including means for mounting said buffing head on said floating boom for pivotal movement relative thereto about first and second mutually perpendicular pivot axes, said first pivot axis being substantially parallel to said rotational axis and said second pivot axis being substantially parallel to said pivot axis of the pivot boom.

16. Apparatus as set forth in claim 15, including:
means for establishing limiting positions of said buffing head in opposite directions about said first pivot axis;
means for urging said buffing head toward a neutral position approximately midway between said limiting positions;
means for establishing an automatic mode of operation; and
means operable in the automatic mode for activating said third power means in a manner to rotate said rotary boom in a direction to pivot the buffing head about said first axis away from either limiting position reached by the buffing head.

17. Apparatus as set forth in claim 15, including:
means for establishing limiting positions of said buffing head in opposite direction about said second pivot axis;
means for urging said buffing head toward a neutral position approximately midway between said limiting positions;
means for establishing an automatic mode of operation; and
means operable in the automatic mode for activating said fourth power means in a manner to pivot said pivot boom in a direction to pivot the buffing head about said second axis away from either limiting position reached by the buffing head.

18. Aircraft body treatment apparatus comprising:
an elongate main boom having in board and outboard ends and a base boom section at said inboard end and an extension boom section at said outboard end, said extension boom section being mounted to said base boom section for extension and retraction relative thereto;
a mobile unit having an elongate boom assembly terminating in an upper boom tip and pivotal up and down to raise and lower said upper boom tip, said main boom being mounted on said upper boom tip to be raised and lowered therewith;
means for effecting selective extension and retraction of said extension boom section;
a rotary boom mounted on said extension boom section for rotation about a rotational axis substantially coinciding with the longitudinal axis of said main boom;
means for selectively adjusting said rotary boom about said rotational axis;
a pivot boom mounted on said rotary boom for pivotal movement about a pivot axis oriented substantially perpendicular to said rotational axis;
mean for selectively pivoting said pivot boom about said pivot axis; and
a treatment head carried on said pivot boom and applicable to the aircraft body to effect a preselected treatment thereof.

19. Aircraft body treatment apparatus comprising:
an elongate main boom having inboard and outboard ends and a base boom section at said inboard end and an extension boom section at said outboard end, said extension boom section being mounted to said base boom section for extension and retraction relative thereto;
a mobile unit having a substantially vertical column and a carriage mounted on said column for up and down movement thereon, said main boom being mounted on said carriage for up and down movement therewith in a manner to maintain the main boom in a substantially horizontal orientation;
means for effecting selective extension and retraction of said extension boom section;
a rotary boom mounted on said extension boom section for rotation about a rotational axis substantially coinciding with the longitudinal axis of said main boom;
means for selectively adjusting said rotary boom about said rotational axis;
a pivot boom mounted on said rotary boom for pivotal movement about a pivot axis oriented substantially perpendicular to said rotational axis;
means for selectively pivoting said pivot boom about said pivot axis; and
a treatment head carried on said pivot boom and applicable to the aircraft body to effect a preselected treatment thereof.

20. Aircraft body treatment apparatus comprising:
an elongate main boom having inboard and outboard ends and a base boom section at said inboard end and an extension boom section at said outboard end, said extension boom section being mounted to said base boom section for extension and retraction relative thereto;
means for mounting said main boom in a manner allowing said outboard end to be raised and lowered;
means for effecting selective raising and lowering of said outboard end;
means for effecting selective extension and retraction of said extension boom section;
a rotary boom mounted on said extension boom section for rotation about a rotational axis substantially coinciding with the longitudinal axis of said main boom;
means for selectively adjusting said rotary boom about said rotational axis;
a pivot boom mounted on said rotary boom for pivotal movement about a pivot axis oriented substantially perpendicular to said rotational axis;
means for selectively pivoting said pivot boom about said pivot axis;
a treatment head carried on said pivot boom and applicable to the aircraft body to effect a preselected treatment thereof;
safety bar means extending around said treatment head at a location to engage an obstacle encountered by the treatment head;
means for sensing when said safety bar means engages an obstacle; and
means for disabling said means for effecting selective raising and lowering, said means for effecting selective extension and retraction, said selective adjusting means and said selective pivoting means when said safety bar means engages an obstacle.

* * * * *